(12) United States Patent
Liang et al.

(10) Patent No.: US 11,250,328 B2
(45) Date of Patent: Feb. 15, 2022

(54) COOPERATIVE EVOLUTION OF DEEP NEURAL NETWORK STRUCTURES

(71) Applicant: Cognizant Technology Solutions U.S. Corporation, College Station, TX (US)

(72) Inventors: Jason Zhi Liang, Fremont, CA (US); Risto Miikkulainen, Stanford, CA (US)

(73) Assignee: Cognizant Technology Solutions U.S. Corporation, College Station, TX (US)

( * ) Notice: Subject to any disclaimer, the term of this patent is extended or adjusted under 35 U.S.C. 154(b) by 1135 days.

(21) Appl. No.: 15/794,913

(22) Filed: Oct. 26, 2017

(65) Prior Publication Data

US 2018/0114116 A1 Apr. 26, 2018

Related U.S. Application Data

(60) Provisional application No. 62/413,176, filed on Oct. 26, 2016, provisional application No. 62/412,830, filed on Oct. 26, 2016.

(51) Int. Cl.
  *G06N 3/08* (2006.01)
  *G06N 3/04* (2006.01)
(52) U.S. Cl.
  CPC .............. *G06N 3/086* (2013.01); *G06N 3/04* (2013.01); *G06N 3/0454* (2013.01); *G06N 3/084* (2013.01)
(58) Field of Classification Search
  CPC ........ G06N 3/04; G06N 3/0454; G06N 3/084; G06N 3/086
  See application file for complete search history.

(56) References Cited

U.S. PATENT DOCUMENTS

| 5,140,530 A | 8/1992 | Guha et al. ............... 395/13 |
| 5,761,381 A | 6/1998 | Arci et al. |
| 5,845,266 A | 12/1998 | Lupien et al. |

(Continued)

FOREIGN PATENT DOCUMENTS

| EP | 0762294 A2 | 3/1997 |
| EP | 2422276 | 2/2012 |

(Continued)

OTHER PUBLICATIONS

Stanley et al., Evolving Neural Networks through Augmenting Topologies, Evolutionary Computation 10(2), pp. 99-127, Summer 2002. (Year: 2002).*

(Continued)

*Primary Examiner* — Kamran Afshar
*Assistant Examiner* — Marshall L Werner
(74) *Attorney, Agent, or Firm* — Dawn-Marie Bey; Bey & Cotropia PLLC

(57) ABSTRACT

The technology disclosed relates to evolving a deep neural network based solution to a provided problem. In particular, it relates to providing an improved cooperative evolution technique for deep neural network structures. It includes creating blueprint structures that include a plurality of supermodule structures. The supermodule structures include a plurality of modules. The modules are neural networks. A first loop of evolution executes at the blueprint level. A second loop of evolution executes at the supermodule level. Further, multiple mini-loops of evolution execute at each of the subpopulations of the supermodules. The first loop, the second loop, and the mini-loops execute in parallel.

20 Claims, 18 Drawing Sheets

(56) References Cited

U.S. PATENT DOCUMENTS

| | | | |
|---|---|---|---|
| 5,920,848 | A | 7/1999 | Schutzer et al. |
| 5,930,780 | A | 7/1999 | Hughes et al. |
| 6,240,399 | B1 | 5/2001 | Frank et al. |
| 6,249,783 | B1 | 6/2001 | Crone et al. |
| 7,013,344 | B2 | 3/2006 | Megiddo |
| 7,246,075 | B1 | 7/2007 | Testa |
| 7,370,013 | B1 | 5/2008 | Aziz et al. |
| 7,444,309 | B2 | 10/2008 | Branke et al. |
| 8,639,545 | B2 | 1/2014 | Cases et al. |
| 8,768,811 | B2 | 7/2014 | Hodjat et al. |
| 9,053,431 | B1 | 6/2015 | Commons ............... G06N 3/08 |
| 9,466,023 | B1 | 10/2016 | Shahrzad et al. |
| 9,785,886 | B1 | 10/2017 | Andoni et al. |
| 2002/0019844 | A1 | 2/2002 | Kurowski et al. |
| 2003/0014379 | A1 | 1/2003 | Saias et al. |
| 2003/0158887 | A1 | 8/2003 | Megiddo |
| 2004/0143559 | A1 | 7/2004 | Ayala ............................. 706/13 |
| 2004/0210545 | A1 | 10/2004 | Branke et al. |
| 2004/0254901 | A1 | 12/2004 | Bonabeau et al. |
| 2005/0033672 | A1 | 2/2005 | Lasry et al. |
| 2005/0136480 | A1 | 6/2005 | Brahmachuri et al. ........ 435/7.1 |
| 2005/0187848 | A1 | 8/2005 | Bonissone et al. |
| 2005/0197875 | A1 | 9/2005 | Kauffman |
| 2005/0198103 | A1 | 9/2005 | Ching |
| 2006/0218107 | A1 | 9/2006 | Young ............................ 706/13 |
| 2007/0100907 | A1 | 5/2007 | Bayer |
| 2007/0143198 | A1 | 6/2007 | Brandes et al. |
| 2007/0143759 | A1 | 6/2007 | Ozgur et al. |
| 2007/0150435 | A1 | 6/2007 | Murakawa et al. |
| 2007/0185990 | A1 | 8/2007 | Ono et al. |
| 2008/0071588 | A1 | 3/2008 | Eder |
| 2008/0228644 | A1 | 9/2008 | Birkestrand et al. |
| 2009/0125370 | A1 | 5/2009 | Blondeau et al. |
| 2009/0327178 | A1 | 12/2009 | Jacobson |
| 2010/0030720 | A1 | 2/2010 | Stephens |
| 2010/0111991 | A1 | 5/2010 | Raitano et al. ............ 424/185.1 |
| 2010/0182935 | A1 | 7/2010 | David |
| 2010/0256795 | A1 | 10/2010 | McLaughlin et al. |
| 2010/0257228 | A1 | 10/2010 | Staggs et al. |
| 2010/0257605 | A1 | 10/2010 | McLaughlin et al. |
| 2010/0274742 | A1 | 10/2010 | Hodjat et al. |
| 2012/0239592 | A1 | 9/2012 | Esbensen |
| 2012/0313798 | A1 | 12/2012 | Markram ......................... 341/50 |
| 2013/0311412 | A1 | 11/2013 | Lazar et al. .............. G06N 3/08 |
| 2014/0011982 | A1 | 1/2014 | Marasco et al. ... C07K 16/1018 |
| 2015/0288573 | A1 | 10/2015 | Baughman et al. |
| 2016/0048753 | A1 | 2/2016 | Sussillo et al. .......... G06N 3/04 |
| 2016/0063359 | A1 | 3/2016 | Szegedy et al. |
| 2016/0329047 | A1 | 11/2016 | Tur |
| 2016/0364522 | A1 | 12/2016 | Frey et al. .............. G06F 19/22 |
| 2017/0109355 | A1 | 4/2017 | Li et al. .............. G06F 17/3053 |
| 2017/0193367 | A1 | 7/2017 | Miikkulainen et al. ....... G06N 3/086 |
| 2017/0213156 | A1 | 7/2017 | Hammond et al. .. G06N 99/005 |
| 2017/0323636 | A1 | 11/2017 | Xiao et al. .............. G10L 15/16 |
| 2018/0053092 | A1 | 2/2018 | Hajizadeh |
| 2018/0114115 | A1 | 4/2018 | Liang et al. |
| 2018/0114116 | A1 | 4/2018 | Liang et al. |
| 2018/0240041 | A1 | 8/2018 | Koch et al. |

FOREIGN PATENT DOCUMENTS

| | | |
|---|---|---|
| EP | 2422278 | 2/2012 |
| JP | 08-10804 | 4/1996 |
| JP | H09114797 | 5/1997 |
| JP | 2001325041 | 11/2001 |
| JP | 2003044665 | 2/2003 |
| JP | 2004240671 | 8/2004 |
| JP | 2004302741 | 10/2004 |
| JP | 2005190372 | 6/2007 |
| JP | 2007207173 | 8/2007 |
| JP | 2007522547 | 8/2007 |
| JP | 2008129984 | 6/2008 |
| WO | WO 2005/073854 | 8/2005 |
| WO | WO 2010/120440 | 10/2010 |
| WO | WO 2017/161233 | 9/2017 |
| WO | WO 2008/213840 | 11/2018 |
| WO | WO 2018/211138 | 11/2018 |

OTHER PUBLICATIONS

Pantridge et al., Evolution of Layer Based Neural Networks: Preliminary Report, GECCO '16, pp. 1015-1022, Jul. 2016. (Year: 2016).*

International Search Report and Written Opinion for PCT App. No. PCT/US19/61198, dated Mar. 11, 2020, 15 pp.

Moriarty, David E., et al., "Forming neural networks through efficient and adaptive coevolution," Evolutionary Computation 5.4, 1997.

Lee, Chi-Ho, et al., "Evolutionary ordered neural network with a linked-list encoding scheme," Proceedings of IEEE International Conference on Evolutionary Computation, IEEE, 1996.

Utech, J., et al., "An evolutionary algorithm for drawing directed graphs," Proc. of the Int. Conf. on Imaging Science, Systems and Technology, 1998.

International Preliminary Report on Patentability for PCT App. No. PCT/US2019/061198, dated Nov. 18, 2020, 24 pp.

Fernando et al., "Pathnet: Evolution channels gradient descent in super neural networks," arXiv preprint arXiv:1701.08734 (2017), 16 pages.

Yang et al., "Deep multi-task representation learning: A tensor factorisation approach," arXiv preprint arXiv:1605.06391 (2016), 12 pages.

Shazeer et al., "Outrageously large neural networks: The sparsely-gated mixture-of-experts layer," arXiv preprint arXiv:1701.06538 (2017), 19 pages.

Misra et al., "Cross-stitch networks for multi-task learning," In Proceedings of the IEEE Conference on Computer Vision and Pattern Recognition, pp. 3994-4003. 2016.

Miikkulainen, Risto, et al., "Evolving Deep Neural Networks," Mar. 4, 2017, 8 pp.

Stanley, Kenneth O., et al., "Real-Time Evolution of Neural Networks in the Nero Video Game," AAAI, vol. 6, 2006, 4 pp.

Scott, E. O., et al., "Understanding Simple Asynchronous Evolutionary Algorithms," Jan. 17-20, 2015, 15 pp.

Li, Xiaodong, and Michael Kirley. "The effects of varying population density in a fine-grained parallel genetic algorithm." Evolutionary Computation, 2002. CEC'02. Proceedings of the 2002 Congress on. vol. 2. IEEE, 2002.

Fidelis, Marcos Vinicius, Heitor S. Lopes, and Alex A. Freitas. "Discovering comprehensible classification rules with a genetic algorithm," Evolutionary Computation, 2000, Proceedings of the 2000 Congress on. vol. 1, IEEE, 2000.

Dec. 23, 2008 International Search Report and Written Opinion for PCT/US2008/82876, 10 pp.

Koza, J.R., "Genetic Programming: On the Programming of Computers by Means of Natural Selection", Dec. 1992, MIT Press, pp. 1-609.

Nov. 26, 2012 Extended EP SR for EP 08847214, 9 pp.

Enee, Gilles et al., "Classifier Systems Evolving Multi-Agent System with Distributed Elitism," Proc. 1999 Congress on Evolutionary Computation (CEC'99) vol. 3:6, Jul. 1999, pp. 1740-1746.

Tanev I et al., "Scalable architecture for parallel distributed implementation of genetic programming on network of workstations," J. Systems Architecture, vol. 47, Jul. 2001, pp. 557-572.

Streichert F., "Introduction to Evolutionary Algorithms," paper to be presented Apr. 4, 2002 at the Frankfurt MathFinance Workshop Mar. 30, 2002, Frankfurt, Germany, XP55038571, 22 pp. (retrieved from the Internet: URL: http://www.ra.cs.uni-tuebingen.de/mita rb/streiche/publications/Introduction to E volutionary Algorithms.pdf).

Poli R et al., "Genetic Programmig: An introductory Tutorial and a Survey of Techniques and Applications," Univ. Essex School of Computer Science and Eletronic Engineering Technical Report No. CES-475, Oct. 2007, 112 pp.

Jun. 16, 2011 Written Opinion from Singapore Patent Office in related application SG 201003127-6, 9 pp.

(56) References Cited

OTHER PUBLICATIONS

Apr. 20, 2012 Exam Report for related application AU 2008323758, 2 pp.
Sakauchi et al., UNIFINE: A Next Generation Financial Solution System of Nihon Unisys Ltd., Technology Review 'UNISYS,' Japan, Nihon Unisys Ltd., Feb. 28, 2006, vol. 25, No. 4, pp. 14-15.
JP 2010-533295, Office Action dated Apr. 16, 2013, 12 pages.
U.S. Appl. No. 14/014,063—Office Action dated May 7, 2014, 19 pages.
JP 2012-508663—Office Action dated Apr. 1, 2014, 6 pages (with English Translation).
JP 2012-508660—Office Action dated Apr. 1, 2014, 8 pages (with English Translation).
International Search Report dated Jun. 29, 2010 in PCT/US10/32841.
M.-R Akbarzadeh-T. et al., "Friendship Modeling for Cooperative Co-Evolutionary Fuzzy Systems: A Hybrid GA-GP Algorithm," Proc. 22nd Int'l Conf. of N. American FIPS, 2003, pp. 61-66.
JE Bartlett II, et al., "Organizational Research: Determining Appropriate Sample Size in Survey Research," IT, Learning, and Performance Journal 19(1) 2001, 8pp.
JC Bongard, et al., "Guarding Against Premature Convergence while Accelerating Evolutionary Search," Proc. 12th annual conf. of Genetic and evolutionary computation, 20201, 8pp.
M Davarynejad, "Fuzzy Fitness Granulation in Evolutionary Algorithms for complex optimization," Master of Science Thesis, Ferdowsi Univ. of Mashhad, 2007, 30pp.
M Davarynejad et al., "A Novel General Framework for Evolutionary Optimization: Adaptive Fuzzy Fitness Granulation," CEC 2007, 6pp.
E Ducheyne et al., "Is Fitness Inheritance Useful for Real-World Applications?" Evolutionary Multi-Criterion Optimization, ser. LNCS 2631, 2003, pp. 31-42.
JM Fitzpatrick et al., "Genetic Algorithms in Noisy Environments," Machine Learning 3: 101-120, 1988.
A Gaspar-Cunha et al., "A Multi-Objective Evolutionary Algorithm Using Neural Networks to Approximate Fitness Evaluations," Int'l J. Computers, Systems and Signals, 6(1) 2005, pp. 18-36.
PS Georgilakis, "Genetic Algorithm Model for Profit Maximization of Generating Companies in Deregulated Electricity Markets," Applied Artificial Intelligence, 2009, 23:6,538-552.
G Gopalakrishnan et al., "Optimal Sampling in a Noisy Genetic Algorithm for Risk-Based Remediation Design," Bridging the gap: meeting the world's water and environmental resources challenges, Proc. World Water Congress 2001, 8 pp.
H Juille, "Evolution of Non-Deterministic Incremental Algorithms as a New Approach for Search in State Spaces," Proc. 6th Int'l Conf. on Genetic Algorithms, 1995, 8pp.
A Kosorukoff, "Using incremental evaluation and adaptive choice of operators in a genetic algorithm," Proc. Genetic and Evolutionary Computation Conference, GECCO—2002, 7pp.
A Nelson, "Fitness functions in evolutionary robotics: A survey and analysis," Robotics and Autonomous Systems 57 (2009) 345-370.
S Remde, et al. "Evolution of Fitness Functions to Improve Heuristic Performance," LION 2007 II, LNCS 5313 pp. 206-219.
J Sacks, et al. "Design and Analysis of Computer Experiments," Statistical Science 4:4, 1989, 409-435.
M Salami, et al., "A fast evaluation strategy for evolutionary algorithms," Applied Soft Computing 2/3F (2003) 156-173.
J Torresen, "A Dynamic Fitness Function Applied to Improve the Generalisation when Evolving a Signal Processing Hardware Architecture," Proc. EvoWorkshops 2002, 267-299 (12 pp).
BA Whitehead. "Genetic Evolution of Radial Basis Function Coverage Using Orthogonal Niches," IEEE Transactions on Neural Networks, 7:6, (1996) 1525-28.
AS Wu et al., "An incremental fitness function for partitioning parallel taks," Proc. Genetic and Evolutionary Computation Conf. (2001) 8pp.
Supplementary European Search Report dated Oct. 12, 2012 in EP 10770288.

Supplementary European Search Report dated Oct. 9, 2012 in EP 10770287.
Lopez Haimes et al., "MRMOGA: parallel evolutionary multi-objective optimization using multiple resolutions," In: Proceedings of IEEE Congress on Evolutionary Computation, 2294-2301, 2005.
Castillo Tapia et al. Applications of multi-objective evolutionary algorithms in economics and finance: A survey. IEEE Congress on Evolutionary Computation 2007: 532-539.
Bui et al. "Local Models: An Approach to Distributed Multi-objective Optimization, Computational Optimization and Applications," Computational Optimization and Application Journal, 2009, 42(1), 105-139.
Leon et al. Parallel Hypervolume-Guided Hyperheuristic for Adapting the Multi-objective Evolutionary Island Model. NICSO 2008: 261-272.
U.S. Appl. No. 13/895,238—Office Action dated Jan. 2, 2014, 17 pages.
Aug. 1, 2012 Office Action in U.S. Appl. No. 13/443,546, 12 pp.
Jun. 22, 2011 Office Action in U.S. Appl. No. 12/267,287, 16 pp.
Jul. 27, 2012 Final Office Action in U.S. Appl. No. 12/267,287, 14 pp.
AU 2010241594—Examination Report dated Oct. 8, 2013, 3 pages.
AU 2010241597—Examination Report dated Nov. 4, 2013, 4 pages.
Myers, R.H. and Montgomery, D.C., "Response Surface Methodology: Process and Product Optimization Using Designed Experiments," New York: John Wiley and Sons, Inc., 1995, pp. 1-700.
Schoreels C., "Agent based Genetic Algorithm Employing Financial Technical Analysis for Making Trading Decisions Using Historical Equity Market Data," IEEE/WIC/ACM International Conference on Intelligent Agent Technology (IAT2004), Beijing, China, 2004, pp. 421-424.
International Search Report dated Jul. 2, 2010 in PCT/US10/32847.
U.S. Appl. No. 15/794,905—Non Provisional Application filed Oct. 26, 2017, 60 pages.
James Bradbury, et al., "Quasi-Recurrent Neural Networks," arXiv:1611.01576v2, Nov. 21, 2016, 11 pp.; Retrieved from the Internet: https//arxiv.org/pdf/1611.01576.pdf?fbclid=1wAR3hreOvBGmJZe54-631X49XedcbsQoDYIRu87BcCHEBf_vMKF8FDKK_7Nw.
Yin, et al., "ABCNN: Attention-Based Convolutional Neural Network for Modeling Sentence Pairs," Transactions of the Association for Computational Linguistics, vol. 4, pp. 259-272, 2016, Retrieved on Aug. 4, 2019, Retrieved from the Internet: https://www.mitpressjounrals.org/doi/pdf/10.1162/tacl_a_00097.
International Search Report and Written Opinion for PCT Application No. PCT/US2019/017175, dated Jun. 5, 2019, 10 pp.
International Search Report and Written Opinion for Application No. PCT/US2018/064520, dated Mar. 4, 2019, 8 pp.
Xu, et al., "Inference of Genetic Regulatory Networks With Recurrent Neural Network Models Using Particle Swarm Optimization," Missouri University of Science and Technology, Oct. 2017, [retrieved on Feb. 14, 2019], Retrieved from the Internet: http://scholarsmine.mst.edu/cgi/viewcontent.cgi?article=1751&context=ele_comeng_facwork.
Kenneth O. Stanley and Risto Miikkulainen, "Evolving Neural Networks Through Augmenting Topologies," Evolutionary Computation, 10(2):99-127, 2002.
International Search Report and Written Opinion for PCT Application No. PCT/US18/64428, dated Mar. 26, 2019, 12 pp.
Garcia-Pedraja, et. al., "Cooperative-Coevolution-of-Artificial-Neural-Networks", 2005, 32 pages.
Stanley, et al., "Evolving Neural Networks through Augmenting Topologies", 2002, 30 pages.
Snoek, et al., "Scalable Bayesian Optimization Using Deep Neural Networks", 2015, 13 pages.
E. Meyerson and R. Miikkulainen, "Pseudo-Task Augmentation: From Deep Multitask Learning to Intratask Sharing and Back," ICML, 2018.
J. Z. Liang, E. Meyerson, and R. Miikkulainen, "Evolutionary Architecture Search For Deep Multitask Networks," GECCO, 2018.
E. Meyerson and R. Miikkulainen, "Beyond Shared Hierarchies: Deep Multitask Learning Through Soft Layer Ordering," ICLR, 2018.

(56) References Cited

OTHER PUBLICATIONS

International Search Report and Written Opinion for PCT Application No. PCT/US18/65472, dated Mar. 27, 2019, 8 pp.
U.S. Appl. No. 15/794,905, titled Evolution of Deep Neural Network Structures, filed Oct. 26, 2017.
U.S. Appl. No. 15/915,028, titled "Asynchronous Evaluation Strategy For Evolution of Deep Neural Networks," filed Mar. 3, 2018.
Risto Miikkulainen, "Evolving Multitask Neural Network Structure," The University of Texas at Austin and Sentient Technologies, Inc., Aug. 26, 2013.
Bredeche, et al., "On-Line, On-Board Evolution of Robot Controllers," In: Artificial Evolution: $9^{th}$ International Conference, Evolution Artificielle, EA, 2009, Strasbourg, France, Oct. 26-28, 2009 [online], [retrieved on Mar. 15, 2019], Retrieved from the Internet: https://dl.acm.org/citation.cfm?id=1883723.1883738.
Rosenbaum, et al., "Routing Networks: Adaptive Selection of Non-Linear Funcdtions For Multi-Task Learning," In: Cornell University Library/Computer Science/Machine Learning, Dec. 31, 2017 [online] [retrieved on Mar. 15, 2019], Retrieved from the Internet: https://arxiv.org/abs/1711.01239v2.
Bonadiman, et al., "Multitask Learning with Deep Neural Networks For Community Question Answering," In: Cornell University Library/Computer Science/Machine Learning, Feb. 13, 2017 [online] [retrieved on Mar. 15, 2019], Retrieved from the Internet: https://arxiv.org/abs/1702.03706.
Ruder, "An Overview of Multi-Task Learning in Deep Neural Networks," In: Cornell University Library/Computer Science/ Machine Learning, Jun. 15, 2017 [online] [retrieved on Mar. 15, 2019], Retrieved from the Internet: https://arxiv.org/abs/1706.05098.
Hodjat et al., "Chapters: Introducing an Age-Varying Fitness Estimation Function." Genetic Programming Theory and Practice X. Ed. Riolo et al., Springer Apr. 19, 2013, pp. 59-71.
Gonzalez, et al., "Evolving Loss Functions With Multivariate Taylor Polynomial Parameterizations," Version 1, published arXiv: 2002.00059v1, Jan. 31, 2020.
Gonzalez, et al., "Evolving Loss Functions With Multivariate Taylor Polynomial Parameterization," Version 2, published arXiv: 2002.00059v2), Feb. 10, 2020.
Gonzalez, et al., "Optimizing Loss Functions Through Multivariate Taylor Polynomial Parameterization," Version 3 (published arXiv:2002.00059v3), Jun. 6, 2020.
N. Hansen, et al., "Adapting arbitrary normal mutation distributions in evolution strategies: The covariance matrix adaptation," In Proceedings of IEEE International Conference on Evolutionary Computation, pp. 312-317, IEEE, 1996.
Hansen, et al., "Completely derandomized self-adaptation in evolution strategies," Evolutionary Computation, vol. 9, No. 2, pp. 159-195, 2001.
N. Hansen, et al., "Evaluating the CMA evolution strategy on multimodal test functions," International Conference on Parallel Problem Solving from Nature, Springer, pp. 282-291, 2004.
H. Li, et al., "Visualizing the loss landscape of neural nets," Advances in Neural Information Processing Systems 31, pp. 6389-6399 (Curran Associates, Inc., 2018).
Liang, et al., "Population-Based Training for Loss Function Optimization," arXiv:2002.04225v1 (Feb. 11, 2020).

"Python vs. R for Artificial Intelligence, Machine Learning, and Data Science," by Scenario or Task by Alex Castrounis of Innoarchitech, published online by O'Reilly Media, Copyright InnoArchiTech LLC 2020 [retrieved on Oct. 16, 2020], Retrieved from the Internet: https://www.innoarchitech.com/blog/python-vs-or-r-artificial-intelligence-ai-machine-learning-data-science-which-use, 27 pp.
Production vs Development Artificial Intelligence and Machine Learning, by Alex Castrounis of Innoarchitech, published online by O'Reilly Media, Copyright InnoArchiTech LLC 2020 [retrieved on Oct. 16, 2020], Retrieved from the Internet: https://www.innoarchitech.com/blog/development-vs-or-production-batch-offline-online-automated-artifical-intelligence-ai-machine-learning, 24 pp.
"Advanced Analytics Packages, Frameworks, and Platforms," by Alex Castrounis of Innoarchitech, published online by O'Reilly Media, Copyright InnoArchiTech LLC 2020 [retrieved Oct. 16, 2020], Retrieved from the Internet: https://www.innoarchitech.com/blog/packages-frameworks-platforms-by-scenario-task-artifical-intelligence-ai-machine-learning-data-science, 29 pp.
Santiago Gonzalez, "Loss Function Optimization Using Evolutionary Computation and Multivariate Function Approximators, Particularly Multivariate Taylor Expansions," 5 pp., Aug. 22, 2019.
Santiago Gonzalez, et al., "Improved Training Speed, Accuracy, and Data Utilization Through Loss Function Optimization," Version 1, arXiv: 1905.11528v1, dated May 27, 2019.
Santiago Gonzalez, et al., "Improved Training Speed, Accuracy, and Data Utilization Through Loss Function Optimization," Version 2, arXiv: 1905.11528v2, dated Feb. 10, 2020.
Santiago Gonzalez, et al., "Improved Training Speed, Accuracy, and Data Utilization Through Loss Function Optimization," Version 3, arXiv: 1905.11528v3, dated Apr. 27, 2020.
J. T. Barron, "A General and Adaptive Robust Loss Function," arXiv: 1701.03077, 2017.
K. Janocha and W. M. Czarnecki, "On Loss Functions For Deep Neural Networks in Classification," arXiv: 1702.05659, 2017.
A. Krizhevsky, et al., "ImageNet Classification With Deep Convolutional Neural Networks," NIPS'12: Proceedings of the 25th International Conference on Neural Information Processing Systems, vol. 1, Dec. 2012, pp. 1097-1105.
"CS 224D: Deep Learning for NLP, Lecture Notes: Part III", 14 pp., Spring, 2016.
"CS 224D: Deep Learning for NLP, Lecture Notes: Part IV", 12 pp., Spring, 2015.
"CS 224D: Deep Learning for NLP, Lecture Notes: Part V", 6 pp., Spring, 2015.
U.S. Appl. No. 62/468,224, titled "Asynchronous Evaluation Strategy For Evolution of Deep Neural Networks," filed Mar. 7, 2017.
Aditya Rawal and Risto Miikkulainen, "From Nodes to Networks: Evolving Recurrent Neural Networks, " GECCO '18, Jul. 15-19, 2018, Kyoto, Japan.
Julian G. Zilly, Rupesh Kumar Srivastava, Jan Koutnik, and Jurgen Schmidhuber, "Recurrent Highway Networks," CoRR. abs/1607.03474. 2016 (Arxiv: 1607.03474).
U.S. Appl. No. 62/627,658, titled "From Nodes to Networks: Evolving Recurrent Neural Networks," filed Feb. 7, 2018.
U.S. Appl. No. 62/627,161, titled "From Nodes to Networks: Evolving Recurrent Neural Networks," filed Feb. 6, 2018.
U.S. Appl. No. 62/598,409, titled "Evolving Multitask Neural Network Structure," filed Dec. 13, 2017.

\* cited by examiner

COOPERATIVE EVOLUTION OF DEEP NEURAL NETWORK STRUCTURES

CROSS REFERENCE TO OTHER APPLICATIONS

This application claims the benefit of U.S. Provisional Patent Application No. 62/413,176, entitled "COOPERATIVE EVOLUTION OF DEEP NEURAL NETWORK STRUCTURES," filed on Oct. 26, 2016. The provisional application is hereby incorporated by reference for all purposes;

This application claims the benefit of U.S. Provisional Patent Application No. 62/412,830, entitled "EVOLUTION OF DEEP NEURAL NETWORK STRUCTURES," filed on Oct. 26, 2016. The provisional application is hereby incorporated by reference for all purposes; and This application incorporates by reference U.S. Nonprovisional patent application Ser. No. 15/794,905, entitled "EVOLUTION OF DEEP NEURAL NETWORK STRUCTURES," filed contemporaneously herewith.

FIELD OF THE TECHNOLOGY DISCLOSED

The technology disclosed relates generally to evolving deep neural network structures, e.g., deep learning neural networks.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

The technology disclosed relates to evolving a deep neural network based solution to a provided problem. In particular, it relates to providing an improved cooperative evolution technique for deep neural network structures. It includes creating blueprint structures that include a plurality of supermodule structures. The supermodule structures include a plurality of modules. The modules are neural networks. A first loop of evolution executes at the blueprint level. A second loop of evolution executes at the supermodule level. Further, multiple mini-loops of evolution execute at each of the subpopulations of the supermodules. The first loop, the second loop, and the mini-loops execute in parallel.

Neuroevolution is a recent paradigm in the area of evolutionary computation focused on the evolution of co-adapted individuals with subcomponents without external interaction. In neuroevolution, a number of species are evolved together. The cooperation among the individuals and/or the subcomponents is encouraged by rewarding the individuals and/or the subcomponents based on how well they cooperate to solve a target problem. The work on this paradigm has shown that evolutionary models present many interesting features, such as specialization through genetic isolation, generalization and efficiency. Neuroevolution approaches the design of modular systems in a natural way, as the modularity is part of the model. Other models need some a priori knowledge to decompose the problem by hand. In many cases, either this knowledge is not available or it is not clear how to decompose the problem.

However, conventional neuroevolution techniques converge the population such that the diversity is lost and the progress is stagnated. Also, conventional neuroevolution techniques require too many parameters to be optimized simultaneously (e.g., thousands and millions of weight values at once). In addition, the deep learning structures used by conventional neuroevolution techniques are excessively large and thus difficult to optimize.

Therefore, an opportunity arises to provide improved systems and methods for cooperatively evolving deep neural network structures.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIG. 11 shows a first evolution at the level of blueprints that comprise the supermodules and a second evolution at the level of supermodules. The first and second evolutions occur in parallel.

DETAILED DESCRIPTION

Figure 1:
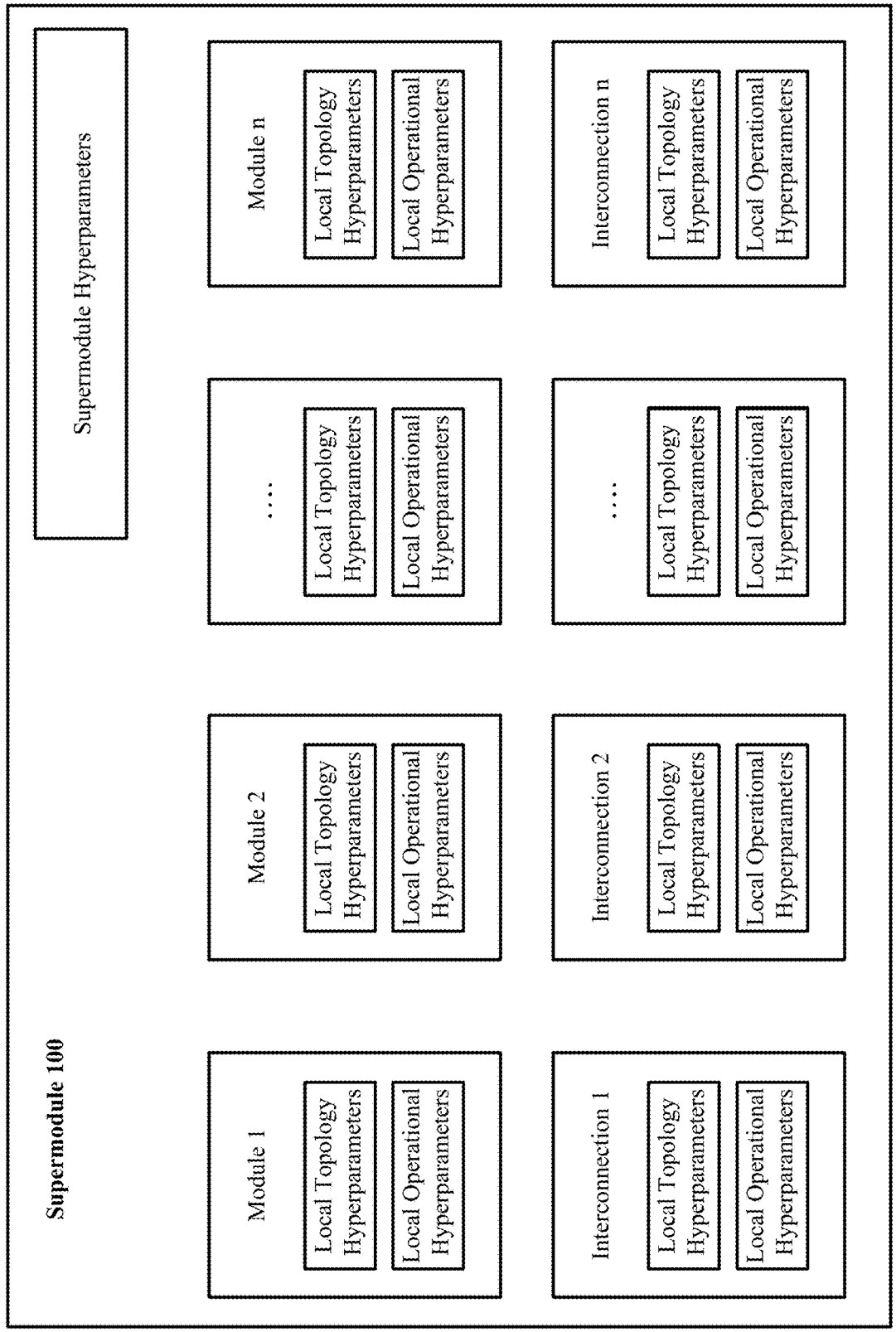
FIG. 1 illustrates one implementation of a supermodule identifying a plurality of supermodule hyperparameters that further identify a plurality of modules in the supermodule and interconnections among the modules in the supermodule.

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

Terminology

Module: As used herein, the term "module" refers to a processor that receives information characterizing input data and generates an alternative representation and/or characterization of the input data. A neural network is an example of a module. Other examples of a module include a multilayer perceptron, a feed-forward neural network, a recursive neural network, a recurrent neural network, a deep neural network, a shallow neural network, a fully-connected neural network, a sparsely-connected neural network, a convolutional neural network that comprises a fully-connected neural network, a fully convolutional network without a fully-connected neural network, a deep stacking neural network, a deep belief network, a residual network, echo state network, liquid state machine, highway network, maxout network, long short-term memory (LSTM) network, recursive neural network grammar (RNNG), gated recurrent unit (GRU), pre-trained and frozen neural networks, and so on. Yet other examples of a module include individual components of a convolutional neural network, such as a one-dimensional (1D) convolution module, a two-dimensional (2D) convolution module, a three-dimensional (3D) convolution module, a feature extraction module, a dimensionality reduction module, a pooling module, a subsampling module, a batch normalization module, a concatenation module, a classification module, a regularization module, and so on. In implementations, a module comprises learnable submodules, parameters, and hyperparameters that can be trained by back-propagating the errors using an optimization algorithm. The optimization algorithm can be based on stochastic gradient descent (or other variations of gradient descent like batch gradient descent and mini-batch gradient descent). Some examples of optimization algorithms used by the technology disclosed include Momentum, Nesterov accelerated gradient, Adagrad, Adadelta, RMSprop, and Adam. In implementations, a module is an activation module that applies a non-linearity function. Some examples of non-linearity functions used by the technology disclosed include a sigmoid function, rectified linear units (ReLUs), hyperbolic tangent function, absolute of hyperbolic tangent function, leaky ReLUs (LReLUs), and parametrized ReLUs (PReLUs). In implementations, a module is a classification module. Some examples of classifiers used by the technology disclosed include a multi-class support vector machine (SVM), a Softmax classifier, and a multinomial logistic regressor. Other examples of classifiers used by the technology disclosed include a rule-based classifier. In implementations, a module is a pre-processing module, such as an input module, a normalization module, a patch-extraction module, and a noise-addition module. In implementations, a module is a post-processing module, such as an output module, an estimation module, and a modelling module. Two modules differ in "type" if they differ in at least one submodule, parameter, or hyperparameter. In some implementations, certain modules are fixed topology modules in which a certain set of submodules are not evolved/modified and/or only evolved/modified in certain generations, and only the interconnections and interconnection weights between the submodules are evolved.

In implementations, a module comprises submodules, parameters, and hyperparameters that can be evolved using genetic algorithms (GAs). Modules need not all include a local learning capability, nor need they all include any submodules, parameters, and hyperparameters, which can be altered during operation of the GA. Preferably some, and more preferably all, of the modules are neural networks, which can learn their internal weights and which are responsive to submodules, parameters, and hyperparameters that can be altered during operation of the GA.

Any other conventional or future-developed neural networks or components thereof or used therein, are considered to be modules. Such implementations will be readily apparent to those skilled in the art without departing from the spirit and scope of the technology disclosed.

Submodule: As used herein, the term "submodule" refers to a processing element of a module. For example, in the case of a fully-connected neural network, a submodule is a neuron of the neural network. In another example, a layer of neurons, i.e., a neuron layer, is considered a submodule of the fully-connected neural network module. In other examples, in the case of a convolutional neural network, a kernel, a filter, a feature extractor, an activation function, a pooling operation, a subsampling operation, and a regularization operation, are each considered submodules of the convolutional neural network module. In some implementations, the submodules are considered as modules, and vice-versa.

Supermodule: As used herein, the term "supermodule" refers to a sequence, arrangement, composition, and/or cascades of one or more modules. In a supermodule, the modules are arranged in a sequence from lowest to highest or from nearest to farthest or from beginning to end or from first to last, and the information characterizing the input data is processed through each of the modules in the sequence. In some implementations, certain supermodules are fixed topology supermodules in which a certain set of modules are not evolved/modified and/or only evolved/modified in certain generations, and only the interconnections and interconnection weights between the modules are evolved. Portions of this application refer to a supermodule as a "deep neural network structure".

Blueprint: As used herein, the term "blueprint" refers to a sequence, arrangement, composition, and/or cascades of one or more supermodules. In a blueprint, the supermodules are arranged in a sequence from lowest to highest or from nearest to farthest or from beginning to end or from first to last, and the information characterizing the input data is processed through each of the supermodules in the sequence. In some implementations, certain blueprints are fixed topology blueprints in which a certain set of supermodules are not evolved/modified and/or only evolved/modified in certain generations, and only the interconnections and interconnection weights between the supermodules are evolved.

Subpopulation: As used herein, the term "subpopulation" refers to a cluster of items that are determined to be similar to each other. In some implementations, the term "subpopulation" refers to a cluster of items that are determined to be more similar to each other than to items in other subpopulations. An item can be a blueprint. An item can be a supermodule. An item can be a module. An item can be a submodule. An item can be any combination of blueprints, supermodules, modules, and submodules. Similarity and dissimilarity between items is determined in dependence upon corresponding hyperparameters of the items, such as blueprint hyperparameters, supermodule hyperparameters, and module hyperparameters. In implementations, a subpopulation includes just one item. In some implementations, each subpopulation is stored separately using one or more databases. In other implementations, the subpopulations are stored together as a single population and only logically clustered into separate clusters.

In some implementations, the term "subpopulation" refers to a cluster of items that are determined to have the same "type" such that items in the same cluster have sufficient similar hyperparameters and/or values for certain hyperparameters to qualify as being of the same type, but enough different hyperparameters and/or values for certain hyperparameters to not be considered as the same item. For instance, subpopulations can differ based on the type of supermodules or modules grouped in the subpopulations. In one example, a first subpopulation can include supermodules that are convolutional neural networks with fully-connected neural networks (abbreviated CNN-FCNN) and a second subpopulation can include supermodules that are fully convolutional networks without fully-connected neural networks (abbreviated FCN). Note that, in the first subpopulation, each of the supermodules has the same CNN-FCNN type and at least one different hyperparameter or hyperparameter value that gives them distinguishing identities, while grouping them in the same first subpopulation. Similarly, in the second subpopulation, each of the supermodules has the same FCN type and at least one different hyperparameter or hyperparameter value that gives them distinguishing identities, while grouping them in the same second subpopulation. In one implementation, this is achieved by representing the hyperparameters values for each of the supermodules as vectors, embedding the vectors in a vector space, and clustering the vectors using a clustering algorithm such as Bayesian, K-means, or K-medoids algorithms.

Preferably, a plurality of subpopulations is maintained at the same time. Also preferably, a plurality of subpopulations is created and/or initialized in parallel. In one implementation, the subpopulations are created by speciation. In one implementation, the subpopulations are modified by speciation. Speciation can create new subpopulations, add new items to pre-existing subpopulations, remove pre-existing items from pre-existing subpopulations, move pre-existing items from one pre-existing subpopulation to another pre-existing subpopulation, move pre-existing items from a pre-existing subpopulation to a new subpopulation, and so on. For example, a population of items is divided into subpopulations such that items with similar topologies, i.e., topology hyperparameters, are in the same subpopulation.

In implementations, for clustering items in the same subpopulation, speciation measures a compatibility distance between items in dependence upon a linear combination of the number of excess hyperparameters and disjoint hyperparameters, as well as the average weight differences of matching hyperparameters, including disabled hyperparameters. The compatibility distance measure allows for speciation using a compatibility threshold. An ordered list of subpopulations is maintained, with each subpopulation being identified by a unique identifier (ID). In each generation, items are sequentially placed into the subpopulations. In some implementations, each of the pre-existing subpopulations is represented by a random item inside the subpopulation from the previous generation. In some implementations, a given item (pre-existing or new) in the current generation is placed in the first subpopulation in which it is compatible with the representative item of that subpopulation. This way, subpopulations do not overlap. If the given item is not compatible with any existing subpopulations, a new subpopulation is created with the given item as its representative. Thus, over generations, subpopulations are created, shrunk, augmented, and/or made extinct.

In Parallel: As used herein, "in parallel" or "concurrently" does not require exact simultaneity. It is sufficient if the evaluation of one of the blueprints begins before the evaluation of one of the supermodules completes. It is sufficient if the evaluation of one of the supermodules begins before the evaluation of one of the blueprints completes.

Identification: As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "specify" is used herein to mean the same as "identify".

In Dependence Upon: As used herein, a given signal, event or value is "in dependence upon" a predecessor signal, event or value of the predecessor signal, event or value influenced by the given signal, event or value. If there is an intervening processing element, step or time period, the given signal, event or value can still be "in dependence upon" the predecessor signal, event or value. If the intervening processing element or step combines more than one signal, event or value, the signal output of the processing element or step is considered "in dependence upon" each of the signal, event or value inputs. If the given signal, event or value is the same as the predecessor signal, event or value, this is merely a degenerate case in which the given signal, event or value is still considered to be "in dependence upon" or "dependent on" or "based on" the predecessor signal, event or value. "Responsiveness" of a given signal, event or value upon another signal, event or value is defined similarly.

System Overview

Supermodules

FIG. 1 illustrates one implementation of a supermodule 100 identifying a plurality of supermodule hyperparameters that further identify a plurality of modules in the supermodule 100 and interconnections among the modules in the supermodule 100. The supermodule hyperparameters include supermodule global topology hyperparameters that identify a plurality of modules (e.g., module 1 to module n) in the supermodule 100 and interconnections among the modules in the supermodule 100. In one implementation, at least one of the modules in the supermodule 100 includes a neural network. In implementations, each supermodule (such as supermodule 100) has associated therewith storage for an indication of a respective supermodule fitness value.

The hyperparameters further include local topology hyperparameters, which apply to the modules and identify a plurality of submodules of the neural network and interconnections among the submodules. In some implementations, the hyperparameters further include global topology hyperparameters. In other implementations, the hyperparameters further include local topology hyperparameters. Global hyperparameters apply to and/or are configured for an entire supermodule, i.e., they apply uniformly across all the modules of a supermodule. In contrast, local hyperparameters apply to and/or are configured for respective modules in a supermodule, i.e., each module in a supermodule can have its own set of local hyperparameters, which may or may not overlap with a set of local hyperparameters of another module in the supermodule.

The "type" of a module is determined by a set of hyperparameters that identify the module. Two modules differ in "type" if they differ in at least one hyperparameter. For example, a convolution module can have the following local topology hyperparameters—kernel size and number of kernels. A fully-connected neural network module can have the following local topology parameters—number of neurons in a given neuron layer, number of neuron layers in the fully-connected neural network, and interconnections and interconnection weights between the neurons in the neural network. In implementations, two modules that have a same set of hyperparameters, but different values for some of the hyperparameters are considered to belong to the same type.

A sample set of hyperparameters according to one implementation includes the following:

| | Topology | Operational |
|---|---|---|
| Global Hyper-parameters | Number of modules, interconnections among the modules, type of interconnections (e.g., residual connections, skip connections), type of modules (e.g., residual blocks). | Learning rate, learning rate decay, momentum, weight initialization, regularization strength, initialization deviation, input initialization deviation, Hue shift, saturation scale, saturation shift, value scale, value shift, pixel dropout, L2 weight decay, and fully-connected layer drop out. |
| Local Hyper-parameters | For a fully-connected neural network module: the number of neurons in each neuron layer, the number of neuron layers, and the interconnections among the neurons from one neuron layer to the next. For a convolutional neural network module: kernel size, number of kernels, kernel depth, kernel stride, kernel padding, activation pooling, subsampling, pooling, and normalization. For an image preprocessing module: image shift, translation, and flipping. | Learning rate, momentum, weight initialization, and fully-connected layer drop out. |
| Blueprint Hyper-parameters | Number of supermodules, interconnections among the supermodules, and supermodule subpopulation for each included supermodule. | |

Figure 2:
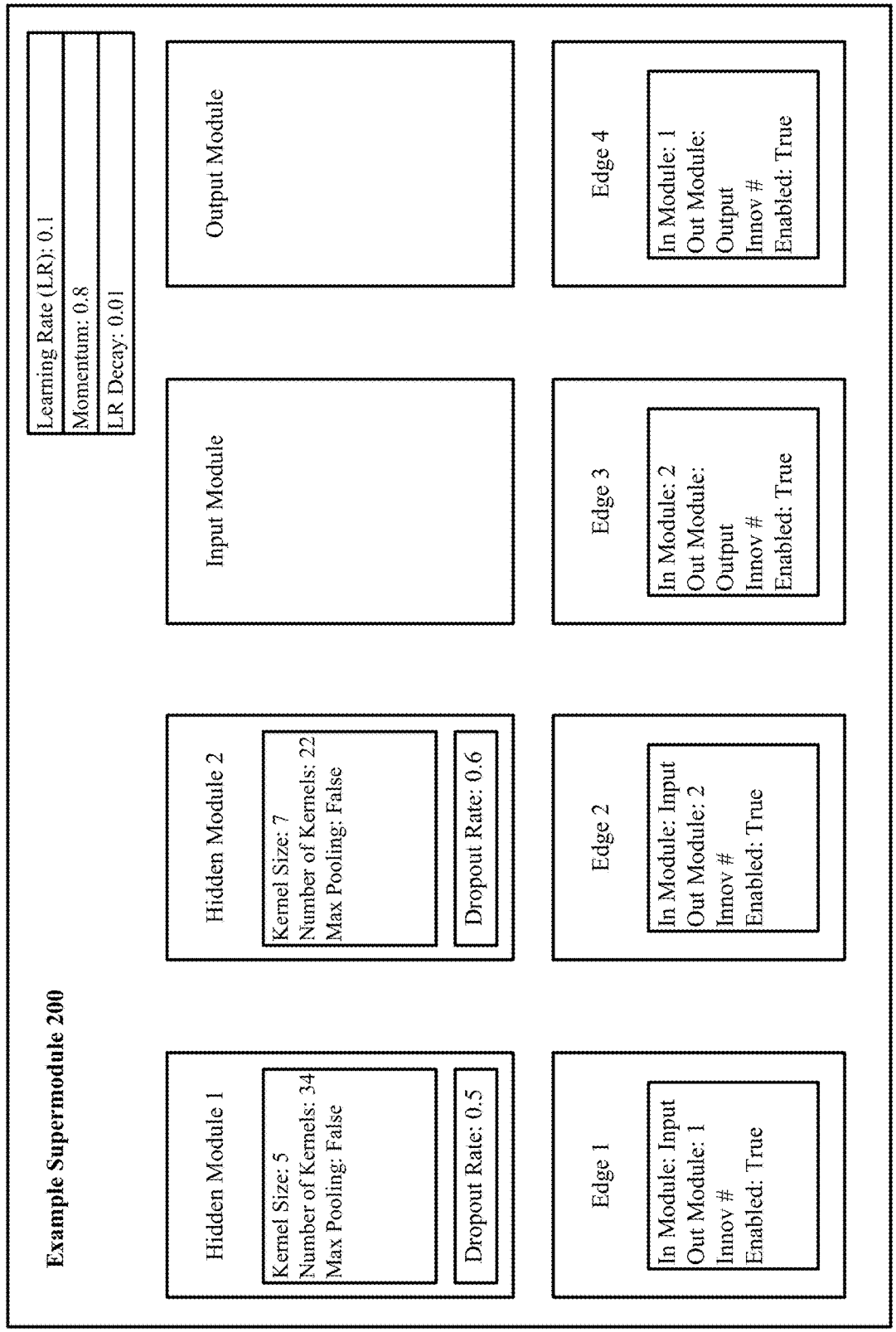
FIG. 2 depicts one implementation of an example supermodule identifying respective values for a plurality of supermodule hyperparameters that further identify a plurality of modules in the supermodule and interconnections among the modules in the supermodule.

FIG. 2 depicts one implementation of an example supermodule 200 identifying respective values for a plurality of supermodule hyperparameters that further identify a plurality of modules in the example supermodule 200 and interconnections among the modules in the example supermodule 200. The supermodule global topology hyperparameters of example supermodule 200 identify four modules, namely a first hidden module that is a first convolution module, a second hidden module that is a second convolution module, an input module, and an output module. The supermodule global topology hyperparameters of example supermodule 200 also identify interconnections among the four modules using edges 1 to 4. Edge 1 identifies that the input module feeds forward to the first hidden module. Edge 2 identifies that the input module also feeds forward to the second hidden module. Edge 3 identifies that the second hidden module also feeds forward to the output module. Edge 4 identifies that the first hidden module also feeds forward to the output module.

Also, in FIG. 2, the global operational hyperparameters, namely learning rate, momentum, and LR decay apply uniformly to all the modules in FIG. 2. Further, the first convolution module has different respective hyperparameter values for the kernel size and the number of kernels than that of the second convolution module. Furthermore, they have different values for the local operational hyperparameter called dropout rate.

In other implementations, different encodings, representations, or structures can be used to identify a module and its interconnections in the disclosed supermodules. For example, encodings, representations, and/or structures equivalent to encodings, representations, and/or structures disclosed in the academic paper "Kenneth O. Stanley and Risto Miikkulainen, "Evolving neural networks through augmenting topologies," *Evolutionary Computation*, 10(2): 99-127, 2002" (hereinafter "NEAT") can be used, which is incorporated by reference for all purposes as if fully set forth herein. In NEAT, the disclosure pertained to evolution of individual neural networks of a single type. In contrast, this application discloses evolution of supermodules that include a plurality of neural networks of varying types.

Figure 3:
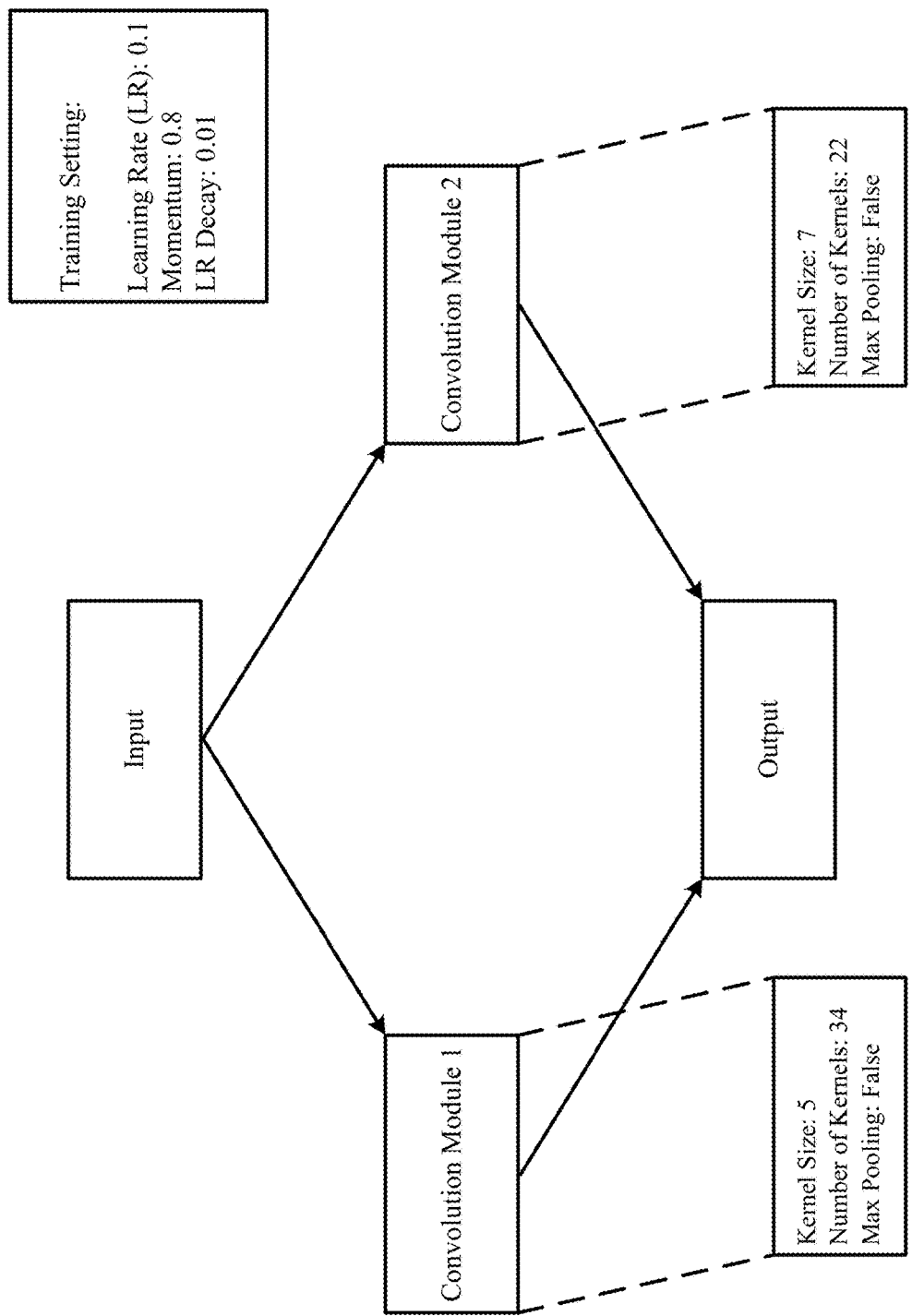
FIG. 3 depicts one implementation of an example deep neural network structure generated in dependence upon the example supermodule depicted in FIG. 2.

FIG. 3 depicts one implementation of an example deep neural network structure 300 generated in dependence upon the example supermodule depicted in FIG. 2. Example deep neural network structure 300 includes an input module that feeds forward to the first and second convolution modules. The first and second convolution modules feed forward to the output module. The hyperparameters in FIG. 2 are applied accordingly to the example deep neural network structure 300 and respective modules.

Figure 4:
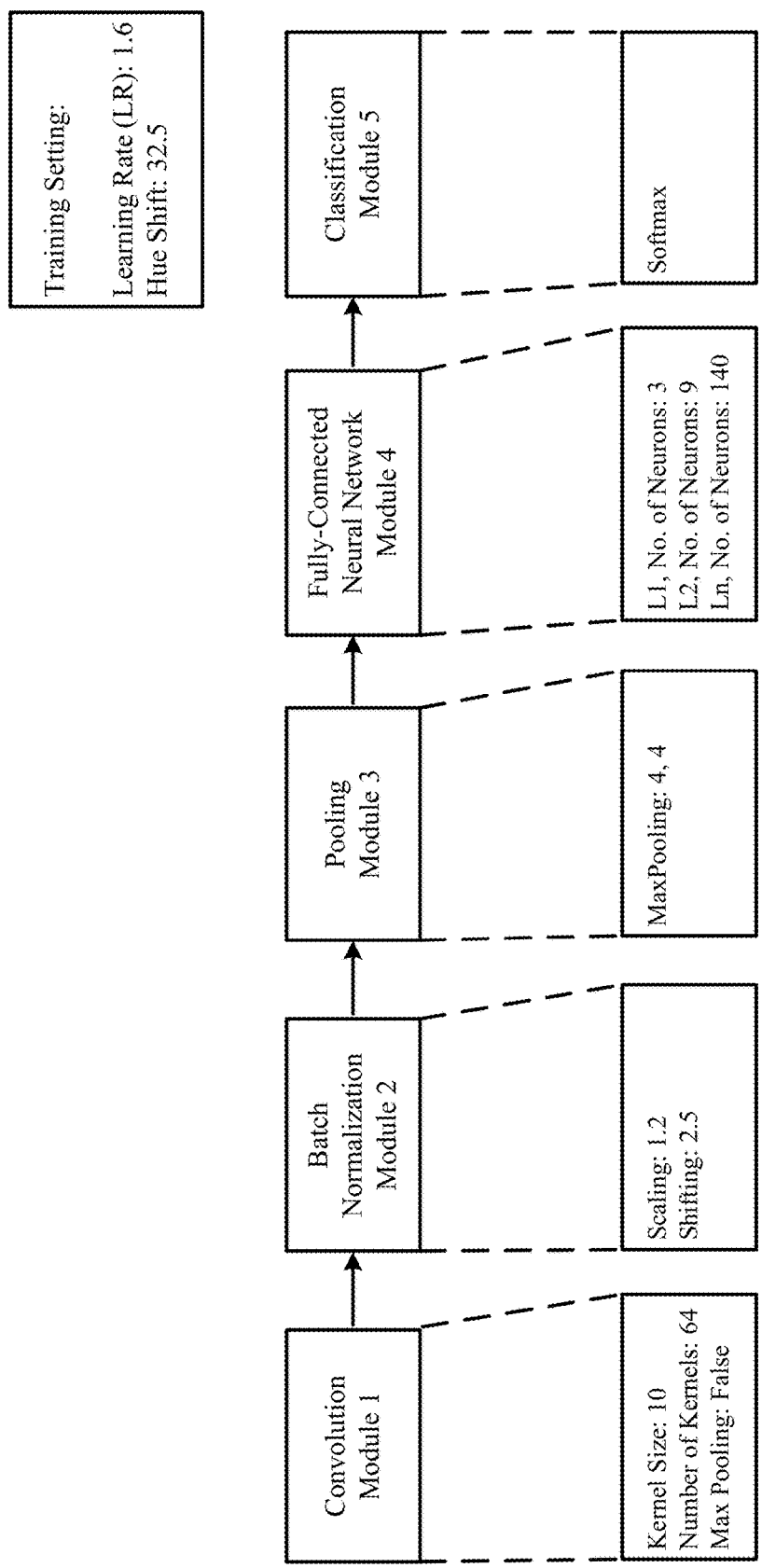
FIG. 4 depicts another implementation of an example deep neural network structure generated in dependence upon an example supermodule generated by the technology disclosed.

FIG. 4 depicts another implementation of an example deep neural network structure 400 generated in dependence upon an example supermodule generated by the technology disclosed. The corresponding example supermodule is not shown for simplicity's sake. The supermodule global topology hyperparameters of the corresponding example supermodule identify five modules, namely a convolution module 1, a batch normalization module 2, a pooling module 3, a fully-connected neural network module 4, and a classification module 5. The local topology hyperparameters of the corresponding example supermodule apply on a module-by-module basis. For example, the batch normalization module 2 has two local topology hyperparameters—scaling and shifting. The pooling module 3 has one local topology hyperparameter—maxpooling. The fully-connected neural network module 4 has the following local topology hyperparameters—number of neurons in each neuron layer, number of neuron layers (e.g., L1, L2, Ln), and interconnections and interconnection weights between the neurons. The classification module 5 has one local topology hyperparameters—softmax. In implementations, the kernels, the neurons, the neuron layers, the interconnections, and the interconnection weights are considered to be submodules of the respective modules.

Blueprints

Figure 5:
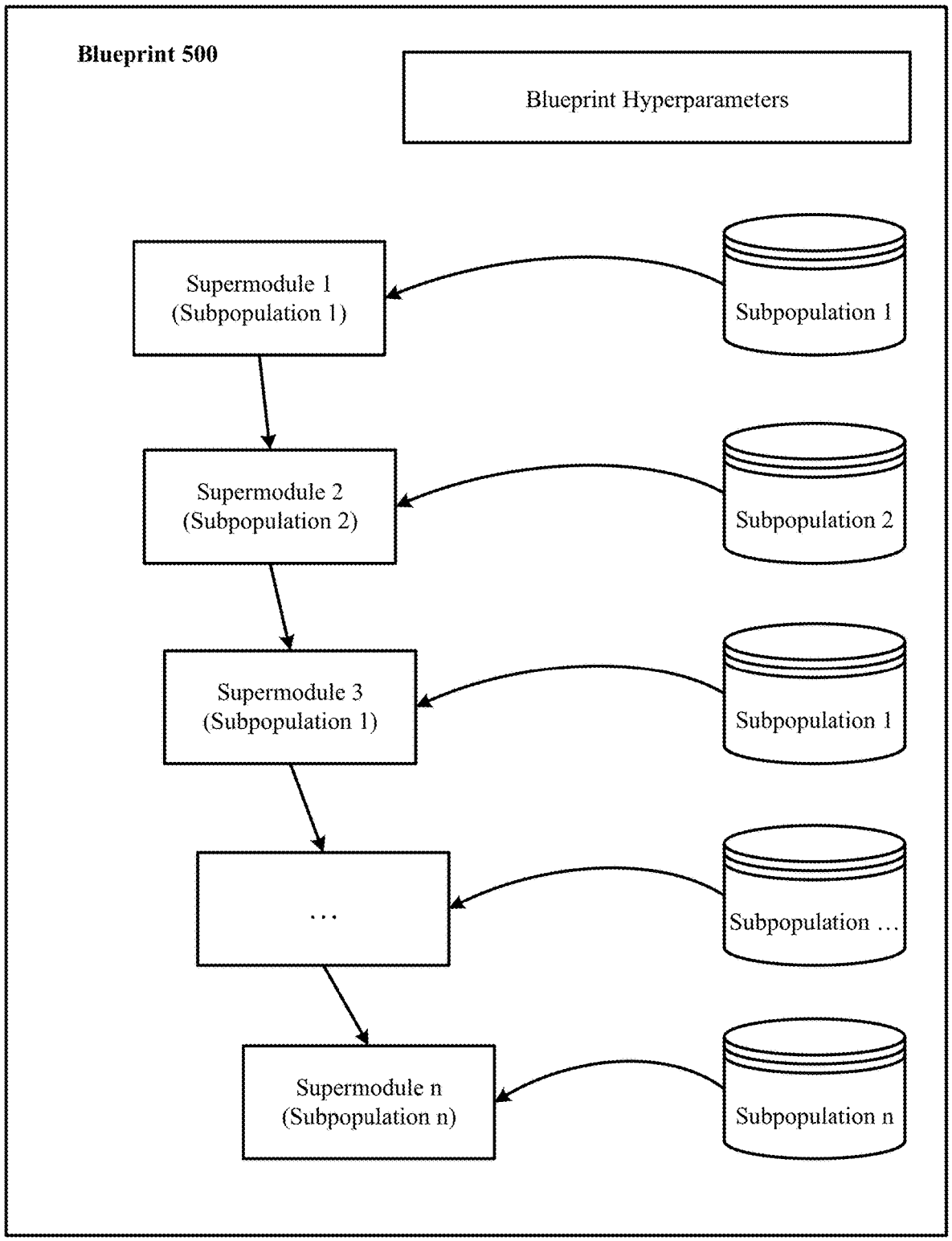
FIG. 5 illustrates one implementation of a blueprint identifying a plurality of blueprint hyperparameters that further identify a plurality of supermodules in the blueprint and interconnections among the supermodules in the blueprint.

FIG. 5 illustrates one implementation of a blueprint 500 identifying a plurality of blueprint hyperparameters that further identify a plurality of supermodules (e.g., supermodule 1 to supermodule n) in the blueprint and interconnections among the supermodules in the blueprint. Blueprint 500 provides a deep neural network based solution to a provided problem. The blueprint topology hyperparameters identify a number of included supermodules in the blueprint 500, interconnections or interconnects among the included supermodules, and the supermodule subpopulations (e.g., subpopulations 1 to n) from which to retrieve each of the included supermodules. Each blueprint (such as blueprint 500) has associated therewith storage for an indication of a respective blueprint fitness value.

In some implementations, as shown in FIG. 5, a blueprint (such as blueprint 500) includes repetitive supermodules, i.e., supermodules slots in the same blueprint that are identified, selected, filled, and/or retrieved by accessing the same supermodule subpopulation. In some implementations, accessing a same supermodule subpopulation results in different supermodule slots of a particular blueprint being filled with same supermodule type. In blueprint 500, the first and the third supermodule slots are filled with supermodules retrieved from the same supermodule subpopulation 1. In such a case, the retrieved supermodules may have the same type but at least one different hyperparameter or hyperparameter value that distinguishes them, according to some implementations. In other implementations, because the supermodules are identified, selected, filled, and/or retrieved randomly from the supermodule subpopulations, it can be the case that the same supermodule is identified, selected, filled, and/or retrieved for multiple supermodule slots in a given blueprint.

Figure 6:
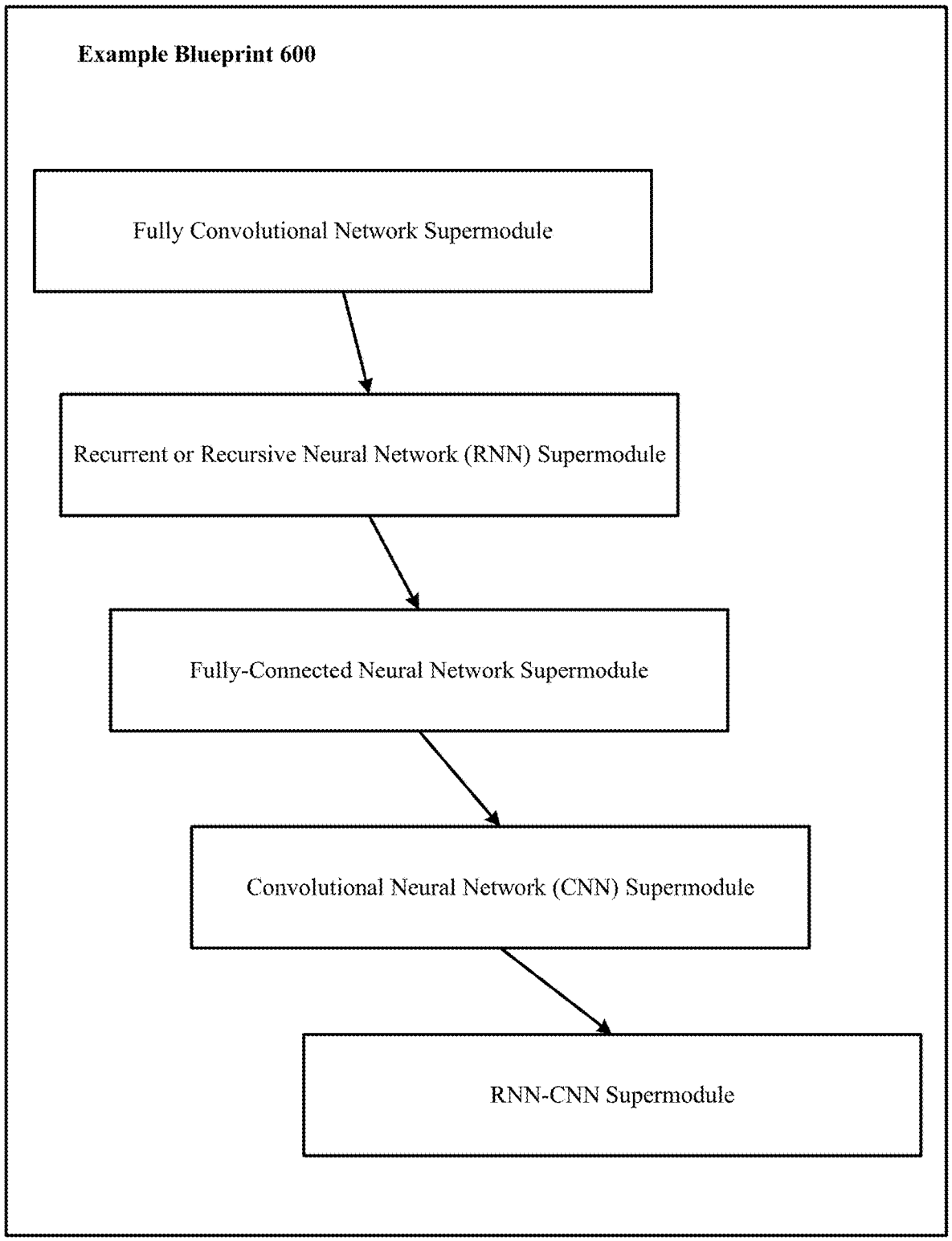
FIG. 6 depicts one implementation of an example blueprint that identifies respective values for a plurality of blueprint hyperparameters which further identify a plurality of supermodules in the blueprint and interconnections among the supermodules in the blueprint.

FIG. 6 depicts one implementation of an example blueprint 600 that identifies respective values for a plurality of blueprint hyperparameters, which in turn identify a plurality of supermodules in the example blueprint 600 and interconnections among the supermodules in the example blueprint 600. In the example shown in FIG. 6, the blueprint global topology hyperparameters of the example blueprint 600 identify five supermodules, namely a fully convolutional network supermodule without a fully-connected neural network, a recurrent or recursive neural network (RNN) supermodule, a fully-connected neural network supermodule, a convolutional neural network (CNN) supermodule with a fully-connected neural network, and a hybrid supermodule that combines a RNN with a CNN into a single RNN-CNN supermodule.

The blueprint global topology hyperparameters of the example blueprint 600 also identify interconnections or interconnects among the five supermodules. In implementations, the interconnections define the processing of data in the example blueprint 600 from the lowest supermodule to the highest supermodule or from the nearest supermodule to the farthest supermodule or from the beginning supermodule to the end supermodule or from the first supermodule to the last supermodule.

Figure 7:
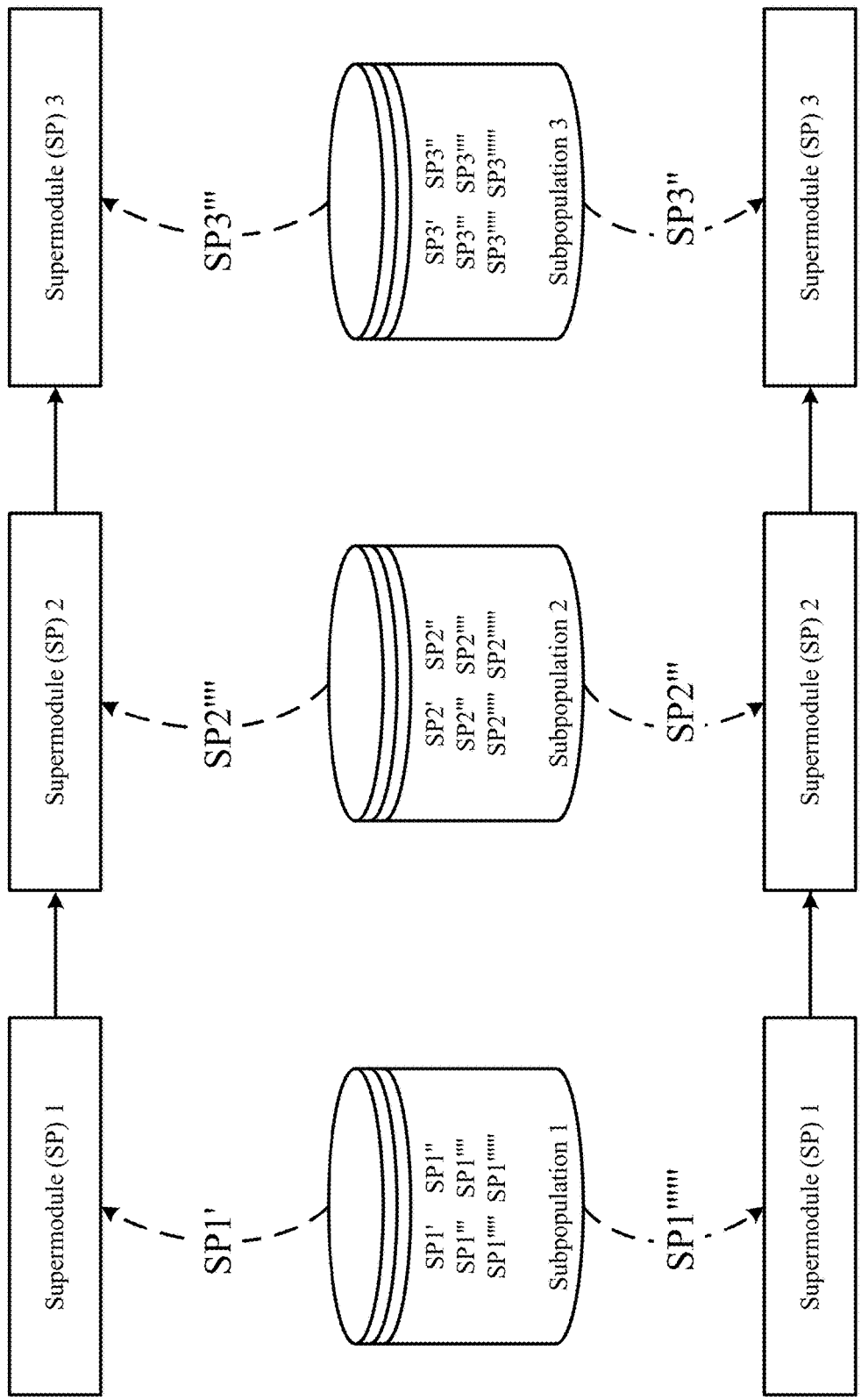
FIG. 7 illustrates one implementation of instantiation of a candidate blueprint as multiple blueprint instantiations, and identifying, from submodule subpopulations, respective values for each of the supermodules identified in each of the blueprint instantiations of the blueprint.

FIG. 7 illustrates one implementation of instantiation of a candidate blueprint as multiple blueprint instantiations, and identifying, from submodule subpopulations, respective values for each of the supermodules identified in each of the blueprint instantiations of the blueprint. In implementations of the technology disclosed, prior to training, a blueprint is instantiated into multiple blueprint instantiations. Each instantiation of a given blueprint has the same topology but different instances of each supermodule from the blueprint-specified subpopulation. In other words, all instantiations of a particular blueprint identify the same blueprint global topology hyperparameters, for example, a number of supermodules to be included in the instantiations, interconnections or interconnects among the supermodules to be included in the instantiations, and the supermodule subpopulations from which to retrieve each of the supermodules to be included in the instantiations.

In the example shown in FIG. 7, a first blueprint has two instantiations—instantiation X and instantiation Y. Instantiations X and Y of the first blueprint have the same blueprint global topology hyperparameters such that they both include three supermodules. More importantly, the supermodules in the respective supermodule sets identified by the instantiations X and Y are to be retrieved from the same corresponding subpopulations 1, 2, and 3. Additionally, in blueprint instantiations X and Y, the comprising supermodules are interconnected in the same order.

Blueprint instantiations of a particular blueprint differ in the way that, even though, to fill their respective supermodule slots, they identify a same subpopulation, they retrieve a different supermodule from the same subpopulation to fill their respective supermodule slots. In the example shown in FIG. 7, each of the subpopulations 1, 2, and 3 includes many supermodules (SPs). The supermodules in a subpopulation have the same type (e.g., CNN), but they also have at least one different hyperparameter or hyperparameter value that makes them separate SPs within the same subpopulation. In FIG. 7, different SPs within the same subpopulation are identified by the varying number of apostrophes symbols (') next to the SPs. Accordingly, in one example, all the SPs in subpopulation 1 can be recurrent or recursive neural networks, all the SPs in subpopulation 2 can be deep belief networks, and all the SPs in subpopulation 3 can be residual networks. In the example shown in FIG. 7, supermodule 1 of first blueprint's instantiation X receives "SP1'" from subpopulation 1 and supermodule 1 of first blueprint's instantiation Y receives "SP1''''" from subpopulation 1; supermodule 2 of first blueprint's instantiation X receives "SP2'''" from subpopulation 2 and supermodule 2 of first blueprint's instantiation Y receives "SP2''" from subpopulation 2; and supermodule 3 of first blueprint's instantiation X receives "SP3'''" from subpopulation 3 and supermodule 3 of first blueprint's instantiation Y receives "SP3''''" from subpopulation 3.

Blueprint Fitness

In implementations, a particular blueprint's fitness is the average performance of all the tested instantiations of the particular blueprint. Using the example shown in FIG. 7, the fitness of the first blueprint is the average of the fitness of its instantiation X and the fitness of its instantiation Y.

Figure 8:
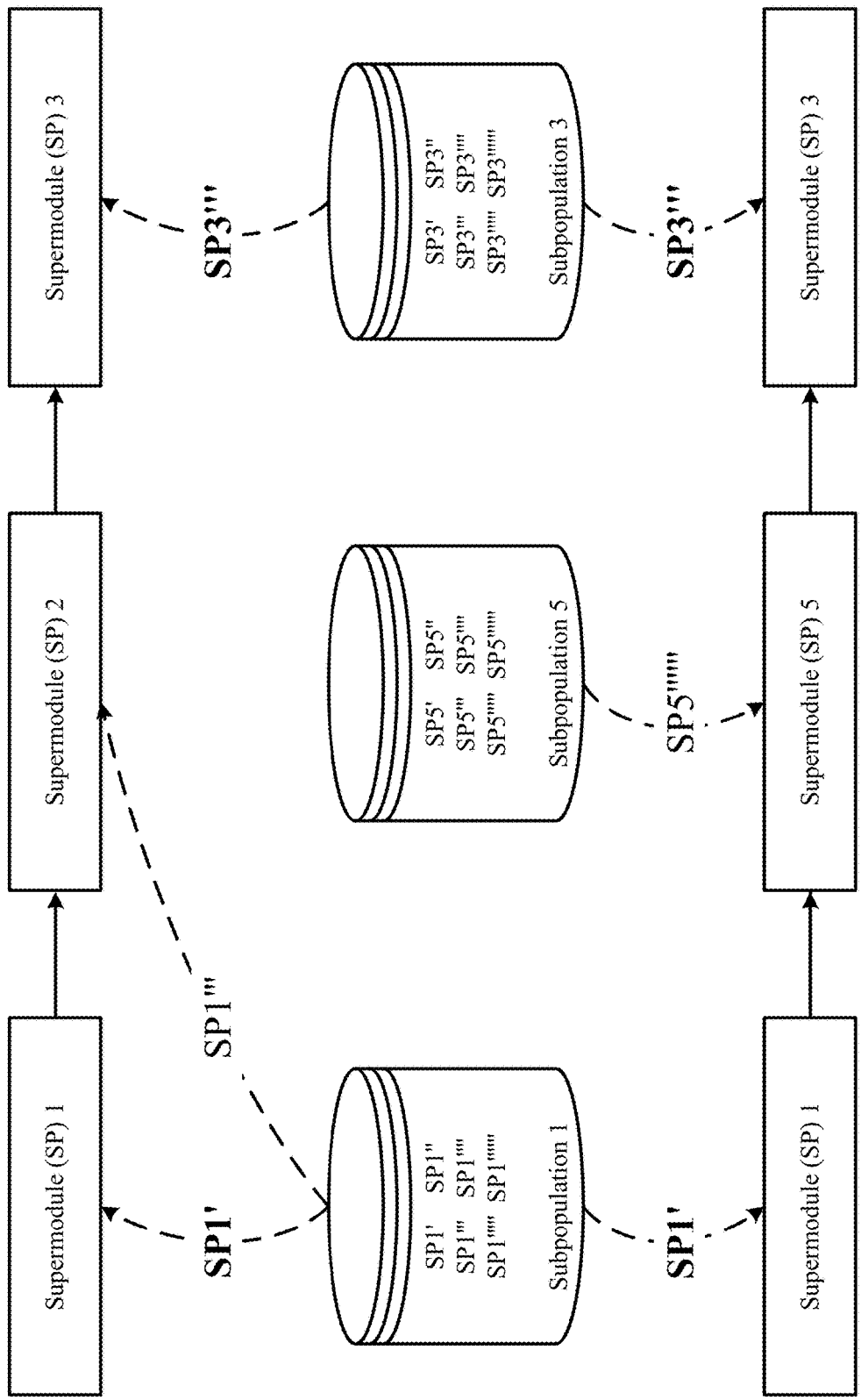
FIG. 8 depicts one implementation of instantiation of two candidate blueprints with identical values for at least one supermodule.

FIG. 8 depicts one implementation of instantiation of two candidate blueprints with identical values for at least one supermodule. In one implementation, two blueprints are considered different blueprints, and not just instantiations of a same blueprint, when they differ based on the type of supermodules identified by them. For example, when a first blueprint identifies a supermodule type not identified by a second blueprint. In another implementation, two blueprints are considered different blueprints, and not just instantiations of a same blueprint, when they differ based on the subpopulations identified by them for filling the supermodule slots. For example, when a first blueprint identifies a subpopulation not identified by a second blueprint. In yet another implementation, two blueprints are considered different blueprints, and not just instantiations of a same blueprint, when they differ based on the number of supermodules identified by them (even though they do not differ based on the supermodule types and the subpopulations). In yet further implementation, two blueprints are considered different blueprints, and not just instantiations of a same blueprint, when they differ based on the interconnections, arrangement and/or sequence of the supermodules identified by them (even though they do not differ based on the supermodule types, the subpopulations, and the number of supermodules).

In the example shown in FIG. 8, first blueprint's instantiation X and second blueprint's instantiation Z are considered different blueprints, and not just instantiations of a same blueprint, at least because they differ based on the supermodule subpopulations they identify to fill their respective supermodule slots. The first blueprint identifies subpopulation 2 to fill its second supermodule slot. In contrast, the second blueprint identifies subpopulation 5 to fill its second supermodule slot.

Note that, in FIG. 8, a particular supermodule "SP1'" from a same subpopulation 1 is identified by the two different blueprints. Also in FIG. 8, note that another particular supermodule "SP3''''" from a same subpopulation 3 is identified by the two different blueprints. This is different from the case of different instantiations of a same blueprint, which do not identify a same particular supermodule from a given subpopulation. Thus, in some implementations of the technology, a same particular supermodule from a given subpopulation can be identified by different blueprints.

If a given supermodule has multiple occurrences in a particular blueprint, then, in some implementations, multiple instances of the given supermodule's fitness are incorporated when determining the average performance of the particular blueprint. In other implementations, only one instance of the given supermodule's fitness is used.

Supermodule Fitness

In implementations, a particular supermodule's fitness is the average performance of all the different blueprints in which the particular supermodule is identified and tested. Using the example shown in FIG. 8, the fitness of the supermodule "SP1'" is the average of the respective fitnesses of the first and second blueprints because supermodule "SP1'" is identified in both of the different blueprints.

Similarly, the fitness of the supermodule "SP3''''" is the average of the respective fitnesses of the first and second blueprints because supermodule "SP3''''" is identified in both of the different blueprints.

FIG. 8 also shows that the first blueprint's instantiation X includes repetitive supermodules, i.e., supermodule slots in a given blueprint that are identified, selected, filled, and/or retrieved with supermodules from a same supermodule subpopulation. In the example used in FIG. 8, supermodules 1 and 2 of the first blueprint's instantiation X are identified, selected, filled, and/or retrieved from a same supermodule subpopulation 1 SP1.

In some implementations, a particular supermodule is used to fill multiple supermodule slots of the same blueprint. In such a case, the fitness calculation of such a repetitive supermodule includes accounting for the duplicate performance during the averaging across performance of different blueprints that included the particular supermodule. In other implementations, the duplicate performance is ignored during the averaging.

Training System

Figure 9:
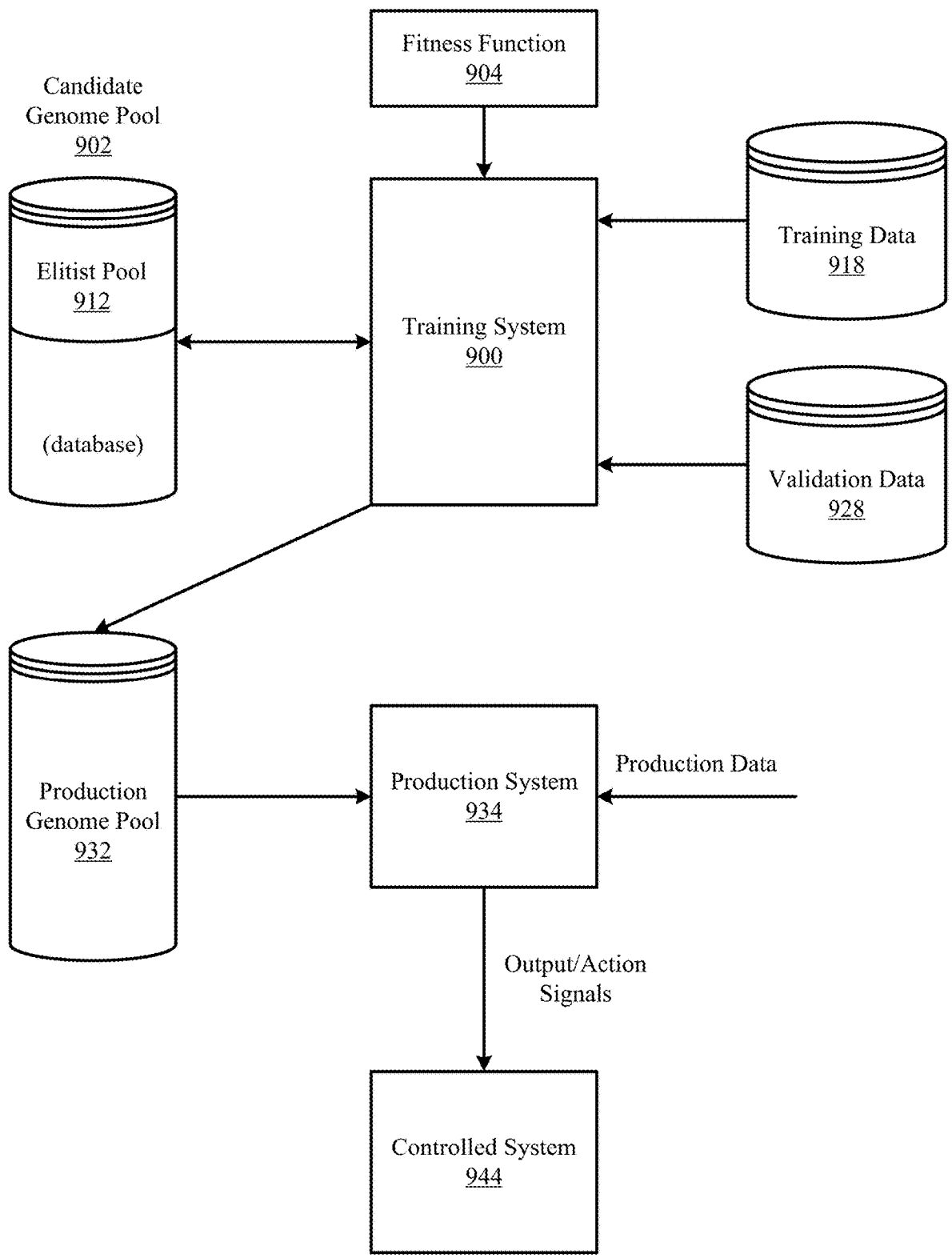
FIG. 9 shows one implementation of a training system that can be used to cooperatively evolve the disclosed blueprints and supermodules. In implementations, various functionalities of the training system, such as speciation, evaluation, competition, and procreation apply equivalently to the disclosed blueprints and supermodules.

FIG. 9 shows one implementation of a training system 900 that can be used to cooperatively evolve the disclosed blueprints and supermodules. In implementations, various functionalities of the training system 900, such as speciation, evaluation, competition, and procreation apply equivalently to the disclosed blueprints and supermodules. In this section, the term "genome" is used to refer to both a blueprint and a supermodule such that, in some implementations, processing of a genome in the training system 900 means speciating, evaluating, discarding, and procreating modules of a supermodule (and corresponding interconnections and interconnection weights), and in other implementations, processing of a genome in the training system 900 means speciating, evaluating, discarding, and procreating supermodules of a blueprint (and corresponding interconnections and interconnection weights). In this section, the two references to genome are meant to equivalently apply at the blueprint level as well as the supermodule level.

The system in FIG. 9 is divided into two portions—the training system 900 and the production system 934. The training system 900 interacts with a database 902 containing a candidate genome pool. As used herein, the term "database" does not necessarily imply any unity of structure. For example, two or more separate databases, when considered together, still constitute a "database" as that term is used herein. In one implementation, the candidate genome pool database 902 represents a blueprint genome database having a pool of candidate blueprints for solutions to a provided problem (e.g., blueprint candidate pool 1112 in FIG. 11). In one implementation, the candidate genome pool database 902 represents a candidate supermodule genome database having a pool of candidate supermodules (e.g., supermodule candidate pool 1104 in FIG. 11). The candidate genome pool database 902 includes a portion containing an elitist pool 912. In some implementations, the candidate genome pool database 902 can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices.

The training system 900 operates according to fitness function 904, which indicates to the training system 900 how to measure the fitness of a genome. The training system 900 optimizes for genomes that have the greatest fitness, however fitness is defined by the fitness function 904. The fitness function 904 is specific to the environment and goals of the particular application. For example, the fitness function may be a function of the predictive value of the genome as assessed against the training data 918—the more often the genome correctly predicts the result represented in the training data, the more fit the genome is considered. In a financial asset trading environment, a genome might provide trading signals (e.g., buy, sell, hold current position, exit current position), and fitness may be measured by the genome's ability to make a profit, or the ability to do so while maintaining stability, or some other desired property. In the healthcare domain, a genome might propose a diagnosis based on patient prior treatment and current vital signs, and fitness may be measured by the accuracy of that diagnosis as represented in the training data 918. In the image classification domain, the fitness of a genome may be measured by the accuracy of the identification of image labels assigned to the images in the training data 918.

In one implementation, the genomes in candidate genome pool database 902 are stored and managed by conventional database management systems (DBMS), and are accessed using SQL statements. Thus, a conventional SQL query can be used to obtain, for example, the fitness function 904 of the genomes. New genomes can be inserted into the candidate genome pool database 902 using the SQL "insert" statement, and genomes being discarded can be deleted using the SQL "delete" statement. In another implementation, the genomes in the candidate genome pool database 902 are stored in a linked list. In such an implementation insertion of a new genome can be accomplished by writing its contents into an element in a free list, and then linking the element into the main linked list. Discarding of genomes involves unlinking them from the main linked list and re-linking them into the free list.

The production system 934 operates according to a production genome pool 932 in another database. The production system 934 applies these genomes to production data, and produces outputs, which may be action signals or recommendations. In the financial asset trading environment, for example, the production data may be a stream of real time stock prices and the outputs of the production system 934 may be the trading signals or instructions that one or more of the genomes in the production genome pool 932 outputs in response to the production data. In the healthcare domain, the production data may be current patient data, and the outputs of the production system 934 may be a suggested diagnosis or treatment regimen that one or more of the genomes in the production genome pool 932 outputs in response to the production data via the production system 934. In the image classification domain, the production data may be user-selected products on a website, and the outputs of the production system 934 may be recommendations of other products that one or more of the genomes in the production genome pool 932 outputs in response to the production data. The production genome pool 932 is harvested from the training system 900 once or at intervals, depending on the implementation. Preferably, only genomes from the elitist pool 912 are permitted to be harvested. In an implementation, further selection criteria are applied in the harvesting process.

In implementations, the production system 934 is a server that is improved by the evolved genomes in the production genome pool 932. In such an implementation, the production system 934 is a server that is responsible for implementing machine learning based solutions to a provided problem. Since the evolved genomes identify hyperparameters that have high fitness function, they improve, for example, the accuracy, the processing speed, and various computations of the production system 934 during its application of machine learning based solutions. In one example, the evolved genomes identify deep neural network structures with higher learning rates. Such specialized structures can be implemented at the production system 934 to provide sub-second responses to queries seeking real-time machine learned answers to a provided problem. In another example, the superior kernels, scaling, and shifting hyperparameters of a convolutional neural network, the superior neurons and neuron layers of a fully-connected neural network, and the superior interconnection weights between the kernels and between the neurons are used to enhance the accuracy of the production system 934 for real-time tasks such as image classification, image recognition, gesture recognition, speech recognition, natural language processing, multivariate testing, pattern recognition, online media recommendation, and so on. The result is an improved production system 934 with enhanced functionalities.

The controlled system 944 is a system that is controlled automatically by the signals from the production system 934. In the financial asset trading environment, for example, the controlled system 944 may be a fully automated brokerage system which receives the trading signals via a computer network (not shown) and takes the indicated action. In a webpage testing environment, for example, the controlled system 944 is a product distribution e-warehouse (e.g., Amazon.com™) that receives the signals via a computer network (not shown) and takes appropriate transactional and delivery actions. Depending on the application environment, the controlled system 944 may also include mechanical systems such as engines, air-conditioners, refrigerators, electric motors, robots, milling equipment, construction equipment, or a manufacturing plant.

The candidate genome pool database 902 is initialized by a population initialization module, which creates an initial set of candidate genomes in the population. These genomes can be created randomly, or in some implementations a priori knowledge is used to seed the first generation. In another implementation, genomes from prior runs can be borrowed to seed a new run. At the start, all genomes are initialized with a fitness function 904 that are indicated as undefined.

A speciating module clusters the genomes into subpopulations based on hyperparameter comparison, as discussed in detail in other portions of this application.

A candidate testing module then proceeds to train the genomes and corresponding modules and/or supermodules in the candidate genome pool database 902 on the training data 918. In one implementation, it does so by back-propagating the errors using an optimization algorithm, as discussed above. Once trained, the candidate testing module then tests the genomes and corresponding deep neural network structures in the candidate genome pool database 902 on the validation data 928. Each genome undergoes a battery of tests or trials on the validation data 928, with each trial testing the genome on one sample. In one implementation, each battery might consist of only a single trial. Preferably, however, a battery of tests is much larger, for example on the order of 1000 trials. Note there is no requirement that all genomes undergo the same number of trials. After the tests, a candidate testing module updates the fitness estimate associated with each of the genomes tested.

In an implementation, the fitness estimate may be an average of the results of all trials of the genome. In this case the "fitness estimate" can conveniently be indicated by two numbers: the sum of the results of all trials of the genome, and the total number of trials that the genome has experienced. The latter number may already be maintained as the experience level of the genome. The fitness estimate at any particular time can then be calculated by dividing the sum of the results by the experience level of the genome. In an implementation such as this, "updating" of the fitness estimate can involve merely adding the results of the most recent trials to the prior sum.

Next, the competition module updates the candidate genome pool database 902 contents in dependence upon the updated fitness estimates. In discarding of genomes in dependence upon their updated fitness values, a competition module compares the updated fitness values of genomes only to other genomes in the same subpopulation, in some implementations. The operation of the competition module is described in more detail below, but briefly, the competition module discards genomes that do not meet the minimum genome fitness of their respective subpopulations, and discards genomes that have been replaced in a subpopulation by new entrants into that subpopulation. In other implementations, the competition module discards genomes that do not meet the minimum baseline genome fitness or whose "genome fitness" relatively lags the "genome fitness" of similarly tested genomes. Candidate genome pool database 902 is updated with the revised contents. In other implementations, all remaining genomes form the elitist pool 912. In yet other implementations, the elitist pool 912 is a subset of the remaining genomes.

After the candidate genome pool database 902 has been updated, a procreation module evolves a random subset of them. Only genomes in the elitist pool 912 are permitted to procreate. Any conventional or future-developed technique can be used for procreation. In an implementation, conditions, outputs, or rules from parent genomes are combined in various ways to form child genomes, and then, occasionally, they are mutated. The combination process for example may include crossover—i.e., exchanging conditions, outputs, or entire rules between parent genomes to form child genomes. New genomes created through procreation begin with performance metrics that are indicated as undefined. Preferably, after new genomes are created by combination and/or mutation, the parent genomes are retained. In this case the parent genomes also retain their fitness function 904, and remain in the elitist pool 912. In another implementation, the parent genomes are discarded.

In implementations, the competition module manages the graduation of genomes from the pool 902 to the elitist pool 912. This process can be thought of as occurring one genome at a time, as follows. First, a loop is begun through all genomes from whom the fitness function 904 have been updated since the last time the competition module was executed. If the fitness function 904 for a current genome is still below a baseline genome fitness or sufficiently lags relative genome fitness of other genomes, then the genome is discarded and the next one is considered. If the fitness function 904 for the current genome is above a baseline genome fitness or relatively on par with genome fitness of other genomes, then the genome is added to the elitist pool 912. The process then moves on to consider the next genome in sequence.

In implementations, the procreation module, in forming new genomes, forms certain new genomes by crossover between two selected parent genomes such that for all new genomes formed by crossover between two selected parent genomes, the two selected parent genomes share a single subpopulation. In one implementation, the procreation module, in forming new genomes, incrementally complexifies the minimal structure modules and/or supermodules in each candidate genome. In some implementations, the incremental complexification comprises adding new submodules and/or modules in the minimal structure modules and/or supermodules using mutation. In another implementation, the procreation module forms new genomes in dependence upon a respective set of at least one parent genome with at least one minimal structure module and/or supermodule, and certain new genomes identify global topology hyperparameter values identifying new complex submodules and/or modules formed in dependence upon the minimal structure module and/or supermodule using crossover. In yet another implementation, the procreation module forms new genomes in dependence upon a respective set of at least one parent genome with at least one minimal structure module and/or supermodule, and at least one of the new genomes identifies values for global topology hyperparameters identifying new complex submodules and/or modules formed in dependence upon the minimal structure module and/or supermodule using crossover.

In some implementations, the procreation module, in forming new genomes, forms certain new genomes by crossover between the global topology hyperparameter values of two selected parent genomes. In one implementation, the crossover between the global topology hyperparameter values of the two selected parent genomes includes a crossover between modules and/or supermodules of the parent genomes. In another implementation, the crossover between the global topology hyperparameter values of the two selected parent genomes includes a crossover between interconnections among modules and/or supermodules of the parent genomes.

In some implementations, the procreation module, in forming new genomes, forms certain new genomes by crossover between the local topology hyperparameter values of respective modules and/or supermodules of two selected parent genomes. In one implementation, the crossover between the local topology hyperparameter values of the two selected parent genomes includes a crossover between submodules and/or modules of the parent genomes. In another implementation, the crossover between the local topology hyperparameter values of the two selected parent genomes includes a crossover between interconnections among submodules and/or modules of the parent genomes.

In some implementations, the procreation module, in forming new genomes, forms certain new genomes by crossover between two selected parent genomes such that at least a first selected parent genome includes certain mismatching blueprint, supermodule, and/or module hyperparameters. In such an implementation, the procreation module forms the new genomes by selecting the mismatching blueprint, supermodule, and/or module hyperparameters when the first selected parent genome has a higher fitness value.

In some implementations, the procreation module, in forming new genomes, forms certain new genomes by crossover between two selected parent genomes such that at least one selected parent genome includes certain mismatching blueprint, supermodule, and/or module hyperparameters. In such an implementation, the procreation module forms the new genomes by randomly selecting at least one of the mismatching blueprint, supermodule, and/or module hyperparameters.

In some implementations, the procreation module, in forming new genomes, forms certain new genomes by crossover between the global operational hyperparameter values of two selected parent genomes.

In some implementations, the procreation module, in forming new genomes, forms certain new genomes by crossover between the local operational hyperparameter values of respective modules and/or supermodules of two selected parent genomes.

In some implementations, the procreation module, in forming new genomes, forms certain new genomes by mutation which adds a new interconnection between two pre-existing modules and/or supermodules.

In some implementations, the procreation module, in forming new genomes, forms certain new genomes by mutation which adds new interconnections between two pre-existing submodules and/or modules.

In some implementations, the procreation module, in forming new genomes, forms certain new genomes by mutation which adds a new module to a pre-existing genome.

In some implementations, the procreation module, in forming new genomes, forms certain new genomes by mutation which adds new interconnections to and from the new module.

In some implementations, the procreation module, in forming new genomes, forms certain new genomes by mutation which adds a new submodule to a pre-existing module and/or supermodule.

In some implementations, the procreation module, in forming new genomes, forms certain new genomes by mutation which adds new interconnections to and from the new submodule and/or module.

In some implementations, the procreation module, in forming new genomes, forms certain new genomes by mutation which deletes a pre-existing module and/or supermodule from a pre-existing genome.

In some implementations, the procreation module, in forming new genomes, forms certain new genomes by mutation which deletes pre-existing interconnections to and from the deleted module and/or supermodule.

In some implementations, the procreation module, in forming new genomes, forms certain new genomes by mutation which deletes a pre-existing submodule from a pre-existing module and/or supermodule.

In some implementations, the procreation module, in forming new genomes, forms certain new genomes by mutation which deletes pre-existing interconnections to and from the deleted submodule and/or module.

In some implementations, the procreation module, in forming new genomes, forms certain new genomes by mutation which changes weights of pre-existing interconnections between the modules and/or supermodules.

In some implementations, the procreation module, in forming new genomes, forms certain new genomes by mutation which changes weights of pre-existing interconnections between the submodules and/or modules.

After procreation, the speciation module and the candidate testing module operate again on the updated candidate genome pool database 902. The process continues repeatedly. In some implementations, a control module iterates the candidate testing module, the competition module, and the procreation module until after the competition module yields a candidate pool of genomes not yet discarded but which satisfy a convergence condition. The convergence condition can be defined as an optimal output of the fitness function 904, according to some definition. The convergence condition may be, for example, a recognition that the candidate pool is no longer improving after each iteration.

The following pseudo code shows one implementation of the operation of the training system 900:

```
set_evolution_parameters
create_candidate_geomes_generation_1
repeat
  repeat
    train_candidate_genomes
    test_candidates_genomes
  until candidate_genome_spread_is_sufficient or
  remove_criteria_is_met
  remove_low_performing_candidate_genomes
  create_new_candidate_genomes
Until performance_is_sufficient or no_more_designs_are_possible
```

In some implementations, the genomes in the candidate genome pool database 902 pool are referred to herein as the "winning genomes". In implementations, each iteration through the candidate testing module, the competition module, and the procreation module can produce just one winning genome or multiple winning genomes.

In some implementations, a candidate harvesting module retrieves the winning genomes from the candidate genome pool database 902 and writes them to the production genome pool database 932. In one implementation, a candidate harvesting module retrieves genomes periodically, whereas in another implementation it retrieves genomes only in response to administrator input.

Cooperative Evolution

Figure 10:
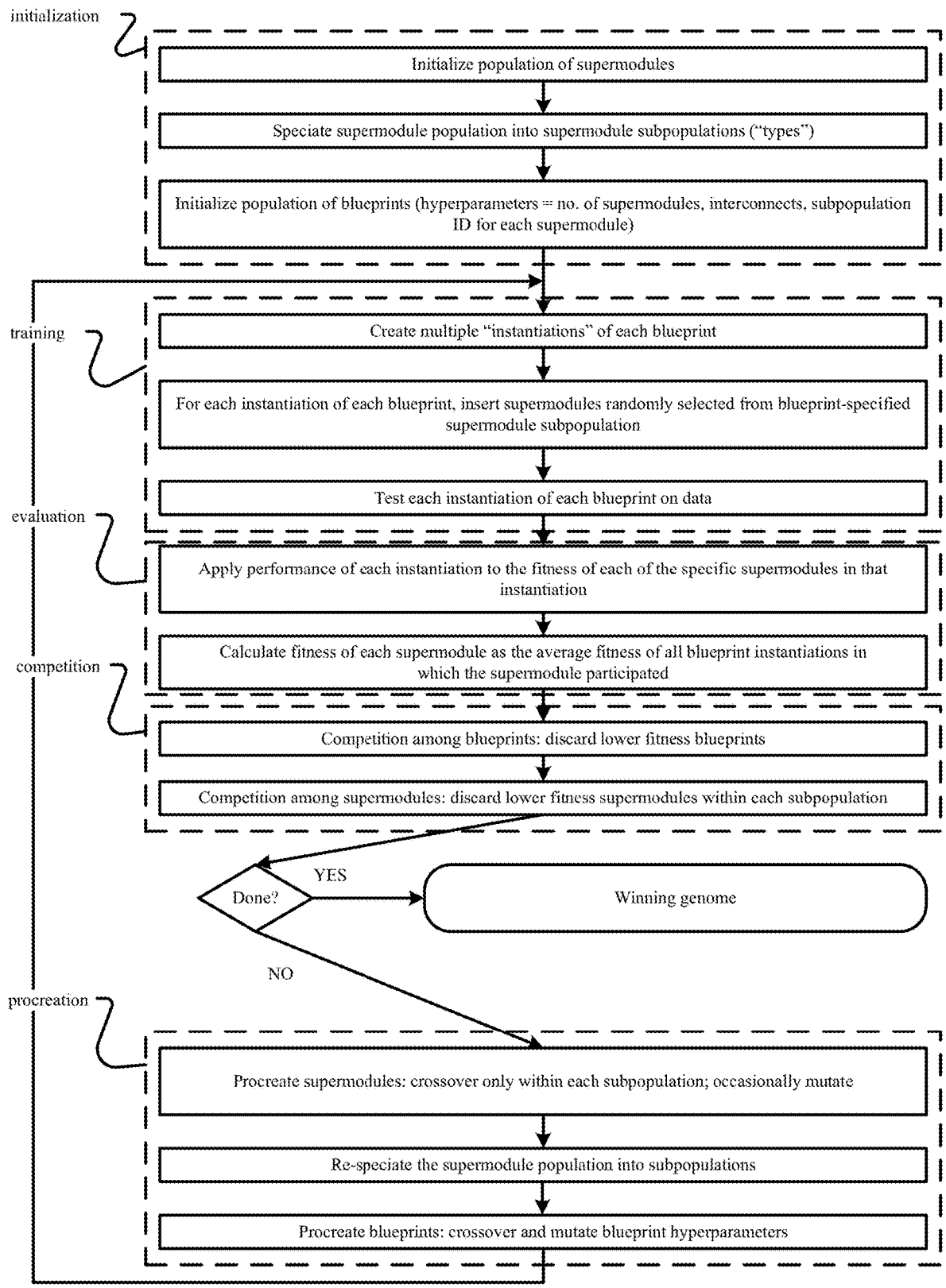
FIG. 10 depicts a representative method of operation of the training system in FIG. 9.

FIG. 10 depicts a representative method of operation of the training system 900 in FIG. 9. Flowchart in FIG. 10 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 10. Multiple actions can be combined in some implementations. For convenience, this flowchart is described with reference to the system that carries out a method. The system is not necessarily part of the method.

In FIG. 10, initialization includes initializing a population of supermodules. Each supermodule corresponds to a deep neural network structure with a plurality of hyperparameters, as discussed above. In some implementations, supermodule global topology hyperparameters of some of the supermodules identify a plurality of minimal structure modules. In one implementation, at least one of the minimal structure modules is a neural network with zero hidden submodules.

In some implementations, some of the supermodules identify uniform respective values for the supermodule global topology hyperparameters. In other implementations, some of the supermodules identify different respective values for the supermodule global topology hyperparameters. In yet other implementations, some of the supermodules identify different respective values for at least one of the local topology hyperparameters. In yet further implementations, some of the supermodules identify different respective values for at least one of local operational hyperparameters. In yet other implementations, some of the supermodules identify different respective values for at least one of global operational hyperparameters.

Initialization also includes speciating or niching the supermodule population into one or more supermodule subpopulations. Speciating includes clustering the supermodule population into subpopulations. Speciating the supermodule population allows supermodules to compete primarily within their own niches instead of with the population at large. This way, new supermodules are protected in a new subpopulation where they have time to optimize their structure through competition within the subpopulation. The idea is to divide the population into subpopulations such that similar topologies are in the same subpopulations. Some implementations of the technology disclosed apply NEAT's techniques of procreating and niching a single neural network at the level of the disclosed blueprints and supermodules, which include a plurality of different types of neural networks. For example, the technology disclosed, in some implementations, uses NEAT's historical markings to track entire modules.

Initialization further includes initializing a population of blueprints. In one implementation, this includes initializing blueprint hyperparameters that identify, for example, a number of different blueprints to be created, a number of instantiations to be created for each blueprint, a number of supermodules to be included in each of the blueprint instantiations, interconnections or interconnects among the supermodules to be included in each of the blueprint instantiations, and the supermodule subpopulations from which to retrieve each of the supermodules to be included in each of the blueprint instantiations. In another implementation, initializing a population of blueprints includes starting with simple structure(s) (e.g., a single supermodule) and randomly procreating it/them to develop an initial blueprint population.

If a given supermodule has multiple occurrences in a particular blueprint, then, in some implementations, multiple instances of the given supermodule's fitness are incorporated when determining the average performance of the particular blueprint. In other implementations, only one instance of the given supermodule's fitness is used.

In FIG. 10, training includes creating multiple instantiations of each of the different blueprints. Training also includes, for each instantiation of each blueprint, randomly inserting supermodules into corresponding supermodule slots from blueprint-specified supermodule subpopulation, according to one implementation. Thus, each instantiation of a given blueprint has the same topology but different instances of each supermodule from the blueprint-specified subpopulation.

Training further includes testing each instantiation of each blueprint on training data 918 of FIG. 9. In one implementation, this includes training supermodules identified in the blueprint instantiations on deep learning tasks such as image classification, image recognition, gesture recognition, speech recognition, natural language processing, multivariate testing, pattern recognition, online media recommendation, and so on. This includes, in some implementations, using back-propagation algorithms to train the modules (e.g., neural networks) and submodules (e.g., kernels, neurons), and their interconnections and interconnection weights, of the supermodules identified in the blueprint instantiations. In implementations, performance of a blueprint instantiation is determined in dependence upon its accuracy in solving the assigned deep learning task when presented with unseen data (such as validation data 928).

In FIG. 10, evaluation includes determining fitness of each supermodule which is calculated as the average fitness of all blueprint instantiations in which the supermodule participated. In one implementation, this includes averaging the performance determined in the current generation with the performance applied to a particular supermodule from all the tests so far. Note that a particular supermodule may be used in multiple instantiations of multiple blueprints with a wide variety of topologies. Accordingly, the supermodule's ability to generalize, i.e., work well in different topologies favors high supermodule fitness.

Evaluation further includes determining fitness of each blueprint as average performance over all its tested instantiations.

In FIG. 10, competition includes competition among blueprints. This results in lower fitness blueprints being discarded. Competition further includes competition among supermodules at a subpopulation level. This results in lower fitness supermodules being discarded within each subpopulation. In implementations, the blueprint competition and the supermodule competition in multiple subpopulations occurs in parallel.

Moving ahead, if the competition yields a pool of supermodules which meets one or more convergence criteria, then winning genome is identified. In one implementation, the winning genome is the highest fitness blueprint instantiation, and identifies the supermodules used to initialize the highest fitness blueprint instantiation. In another implementation, the winning genome is considered to the blueprint with highest fitness, which is instantiated with highest fitness supermodules from each subpopulation specified in the blueprint. Note that, in some implementations, the winning instantiation of the winning blueprint may never have been tested specifically. But the high supermodule fitness signifies good performance in many blueprint topologies, and the high blueprint fitness signifies good performance over many combinations of instantiated supermodule selections. In an implementation, the winning solution can be validated on unseen data (such as validation data 928 in FIG. 9) before deployment, and if sub-par, either a different combination of high fitness supermodules can be substituted, or a different high fitness blueprint can be substituted, or both, and validation tried again.

If the competition does not yield a pool of supermodules which meets a convergence condition, then procreation occurs. In FIG. 10, procreation includes procreating supermodules. This includes crossover within each subpopulation, accompanied with occasional mutation in some implementations. Procreation also includes re-speciating the supermodule population into subpopulations.

Procreation further includes procreating blueprints. This includes crossover within each subpopulation, accompanied and mutation of blueprint hyperparameters.

After procreation, training, evaluation, and competition are executed again. The process continues repeatedly. In some implementations, the process is iterated until after a pool of supermodules not yet discarded but which satisfy a convergence condition is identified. The convergence condition can be defined as an optimal output of the fitness function 904 in FIG. 9, according to some definition. The convergence condition may be, for example, a recognition that the pool is no longer improving after each iteration.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as terminology, system overview, supermodules, blueprints, blueprint fitness, supermodule fitness, training system, example results, client-server architectures, computer system, and claims.

Other implementations of the method described in this section can include a computer readable storage medium storing instructions in a non-transitory manner, which are executable by a processor to perform any of the methods described above. Yet another implementation of the method described in this section can include a system including memory and one or more processors operable to execute instructions, stored in the memory, to perform any of the methods described above.

Figure 11:
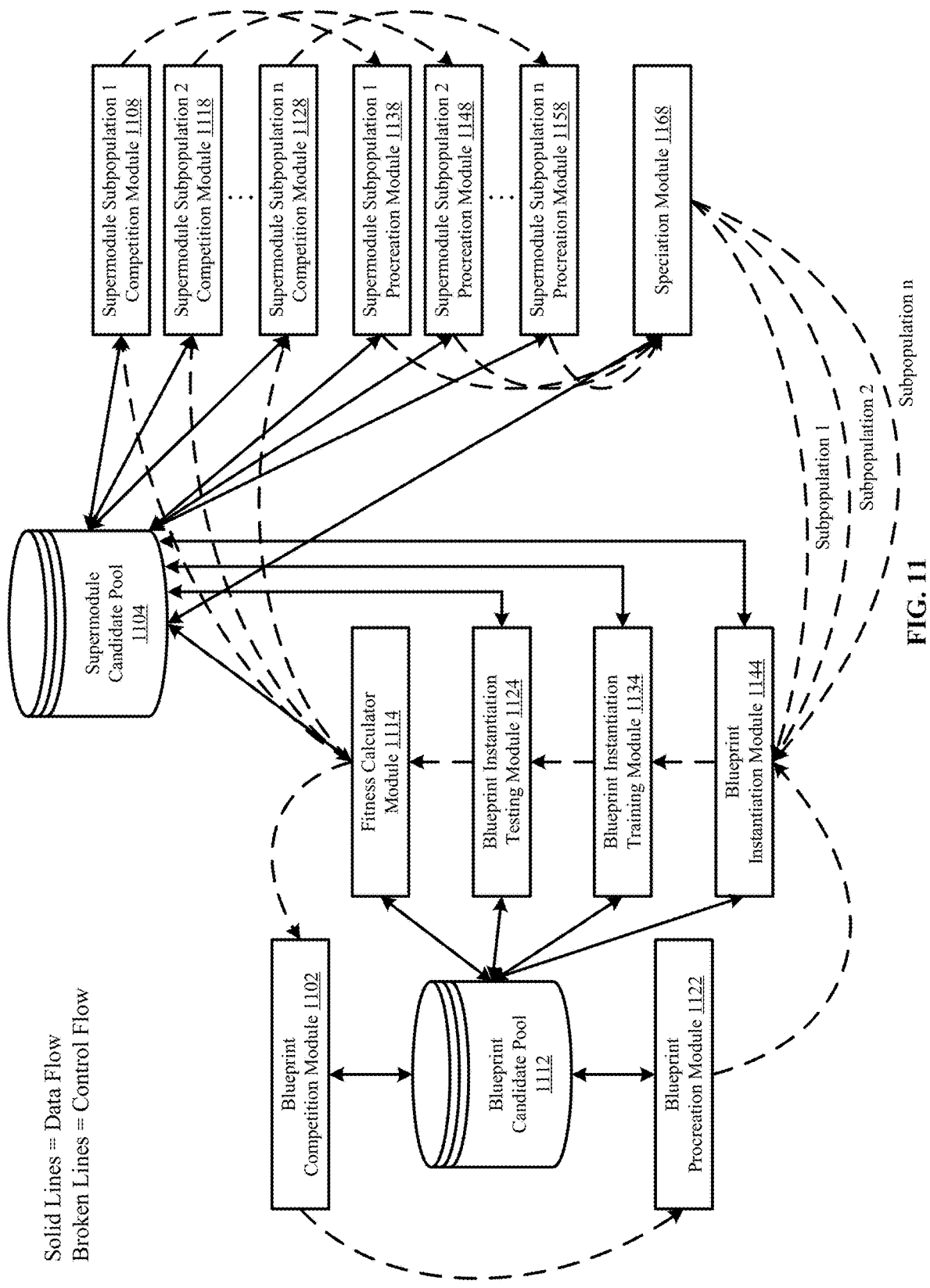
FIG. 11 illustrates various modules that can be used to implement the functionality of the training system in FIG. 9. In particular.

FIG. 11 illustrates various modules that can be used to implement the functionality of the training system 900 in FIG. 9. In particular, FIG. 11 shows a first evolution at the level of blueprints that comprise the supermodules and a second evolution at the level of supermodules. The first and second evolutions occur in parallel. In FIG. 11, solid lines indicate data flow and broken lines indicate control flow. The modules in FIG. 11 can be implemented in hardware or software, and need not be divided up in precisely the same blocks as shown in FIG. 11. Some can also be implemented on different processors or computers, or spread among a number of different processors or computers. In addition, it will be appreciated that some of the modules can be combined, operated in parallel or in a different sequence than that shown in FIG. 11 without affecting the functions achieved. Also as used herein, the term "module" can include "sub-modules", which themselves can be considered herein to constitute modules. For example, modules 1108, 1118 and 1128 are also considered herein to be submodules of a competition processor. The blocks in FIG. 11 designated as modules can also be thought of as flowchart steps in a method.

FIG. 11 depicts multiple loops of evolution executing in parallel. A first loop of evolution operates at the blueprint level. A second loop of evolution operates at the supermodule level. Furthermore, speciation creates multiple mini-loops of evolution which also operate in parallel at each supermodule subpopulation level.

At the blueprint level, a blueprint instantiation module 1144 instantiates an initial population of blueprints and blueprint instantiations by inserting in respective supermodule slots supermodules from the supermodule subpopulations (e.g., subpopulations 1 to n) identified by the blueprints and the blueprint instantiations.

Then, a blueprint instantiation training module 1134 trains on training data 918 in FIG. 9 each of the blueprint instantiations. In particular, the neural network expressions of the supermodules inserted in each of the blueprint instantiations are trained. In one implementation, all the neural network modules in a supermodule are trained together. In another implementation, all the neural network supermodules in a blueprint instantiation are trained together.

Then, a blueprint instantiation testing module 1124 tests on validation data 928 in FIG. 9 (i.e., unseen test data) each of the blueprint instantiations. In particular, the neural network expressions of the supermodules inserted in each of the blueprint instantiations are tested. In one implementation, all the neural network modules in a supermodule are tested together. In another implementation, all the neural network supermodules in a blueprint instantiation are tested together.

Testing each of the blueprint instantiations results in a performance measure of each of the blueprint instantiations. A fitness calculator module 1114 uses this performance measure to update the fitness of the blueprints and the included supermodules. In one implementation, for a given blueprint, the fitness is calculated by taking an average of the respective fitnesses of corresponding blueprint instantiations of the given blueprint, as discussed above. So, if a particular blueprint had three blueprint instantiations which had respective performance measures of 30%, 40%, and 50%, then the particular blueprint's fitness will be the average of 30%, 40%, and 50%, i.e., 40%. In one implementation, for a given supermodule, the fitness is calculated by continuously assigning the given supermodule a fitness of the blueprint in which it is included, and taking an average of the respective fitnesses of all the blueprints in which the it was included, as discussed above. So, if a particular supermodule was included in three different blueprints which had respective performance measures of 10%, 20%, and 30%, then the particular supermodule's fitness will be the average of 10%, 20%, and 30%, i.e., 20%.

Once the fitness of the blueprints and the included supermodules is updated, the blueprints are sent to the blueprint competition module 1102 where certain low fitness blueprints are discarded, as discussed above. Following that, the blueprints that are not discarded are subject to procreation at the blueprint procreation module 1122, as discussed above. This is the first evolution loop at the blueprint level.

On the other hand, the included supermodules are sent to their respect subpopulations where they undergo competition and procreation only within their respective subpopulations. This is the second evolution loop at the subpopulation level and also creates multiple mini-loops of evolution at the level of each of the subpopulations. The second loop and the mini-loops of evolution are depicted in FIG. 11 using supermodule subpopulation 1, 2, and 3 competition modules 1108, 1118, and 1128 and supermodule subpopulation 1, 2, and 3 procreation modules 1138, 1148, and 1158. After procreation, the supermodules undergo speciation at the speciation module 1168 to create new and modified subpopulations, as discussed above.

The new and modified subpopulations are then again used to instantiate blueprints coming out of the blueprint procreation module 1122. The process continues until a convergence condition is met, as discussed above.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as terminology, system overview, supermodules, blueprints, blueprint fitness, supermodule fitness, training system, example results, client-server architectures, computer system, and claims.

Other implementations of the method described in this section can include a computer readable storage medium storing instructions in a non-transitory manner, which are executable by a processor to perform any of the methods described above. Yet another implementation of the method described in this section can include a system including memory and one or more processors operable to execute instructions, stored in the memory, to perform any of the methods described above.

Example Results

Figure 12A:
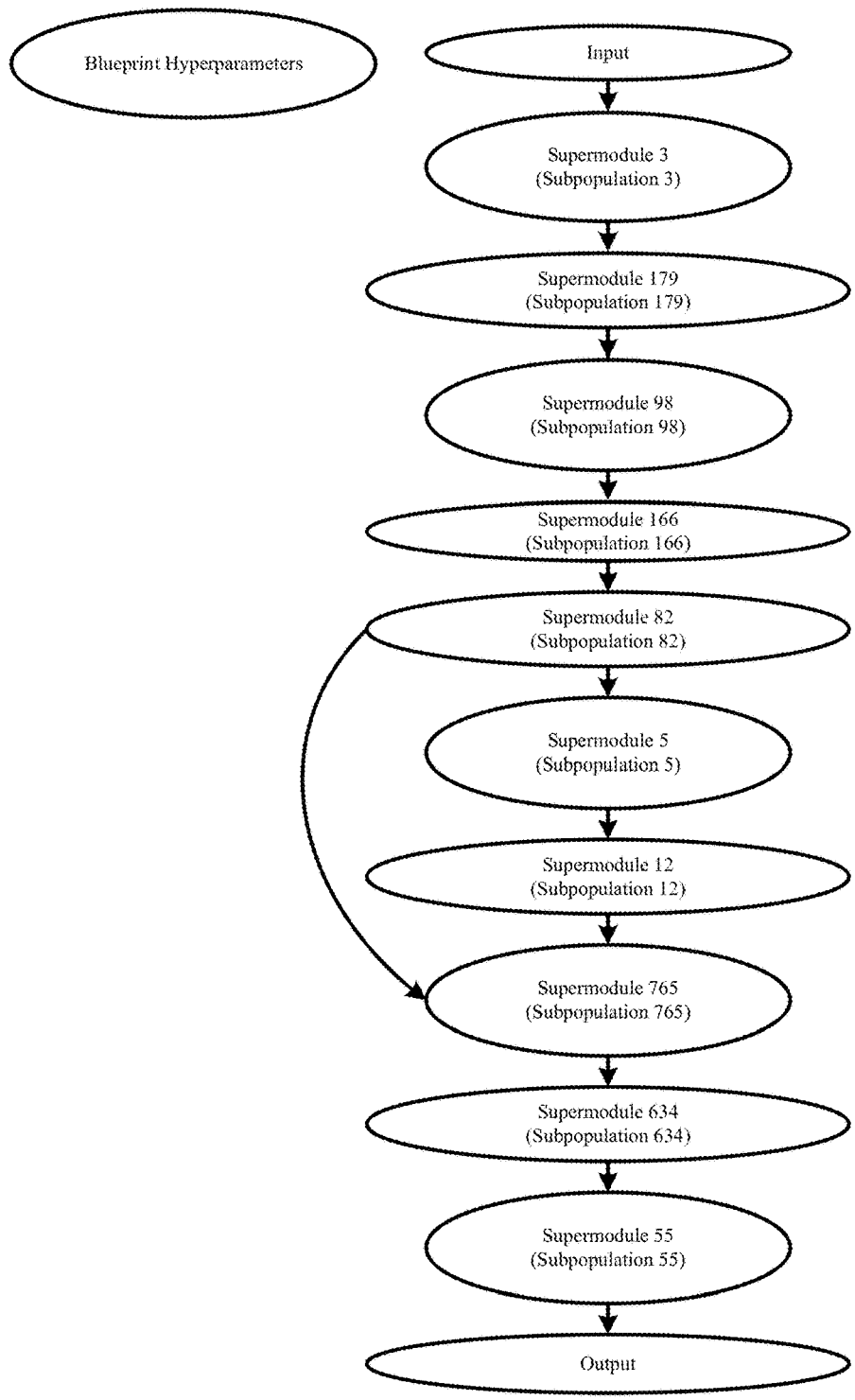
FIGS. 12A, 12B, and 12C illustrate examples of evolved blueprints in accordance with implementations of the technology disclosed.
Figure 12B:
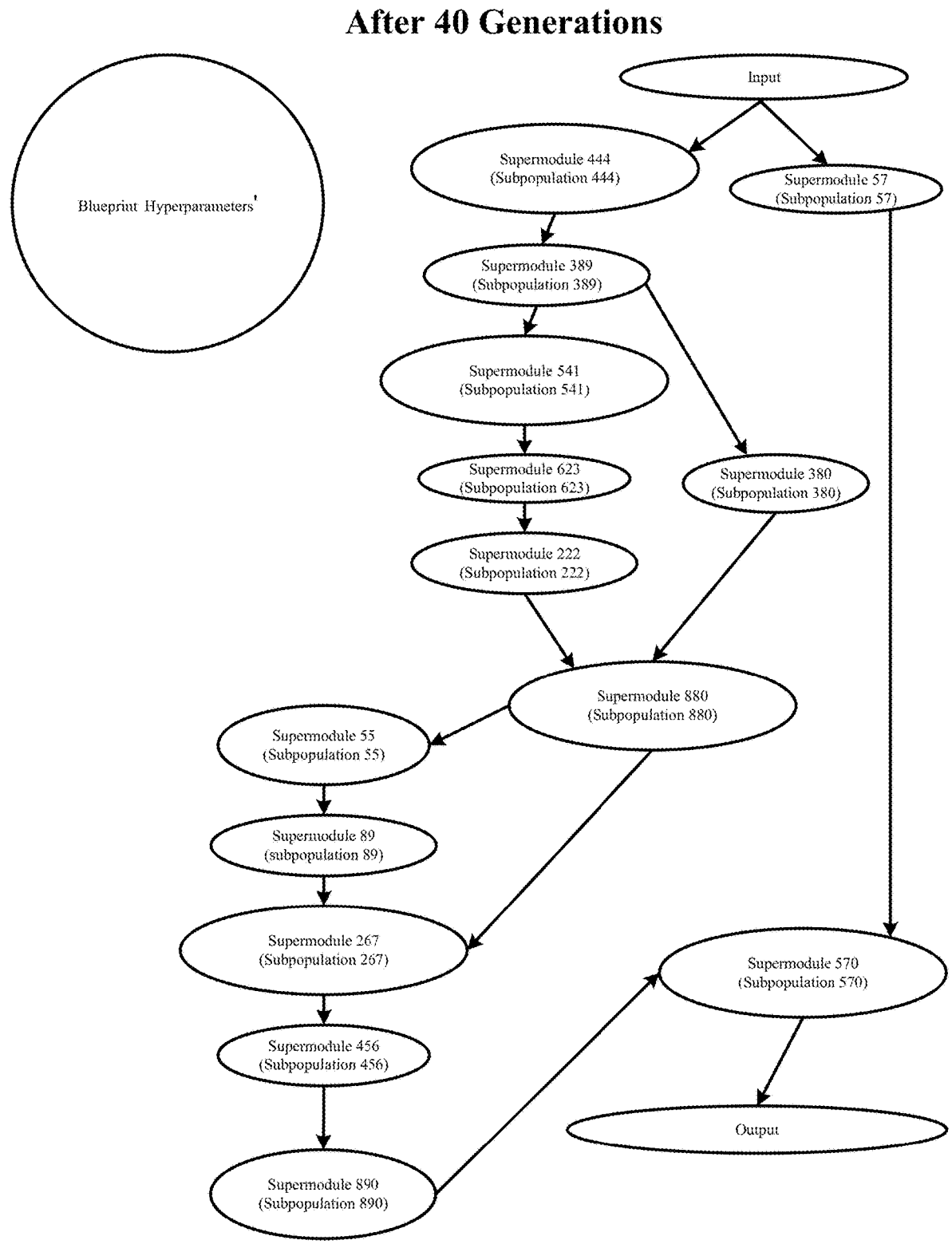
Figure 12C:
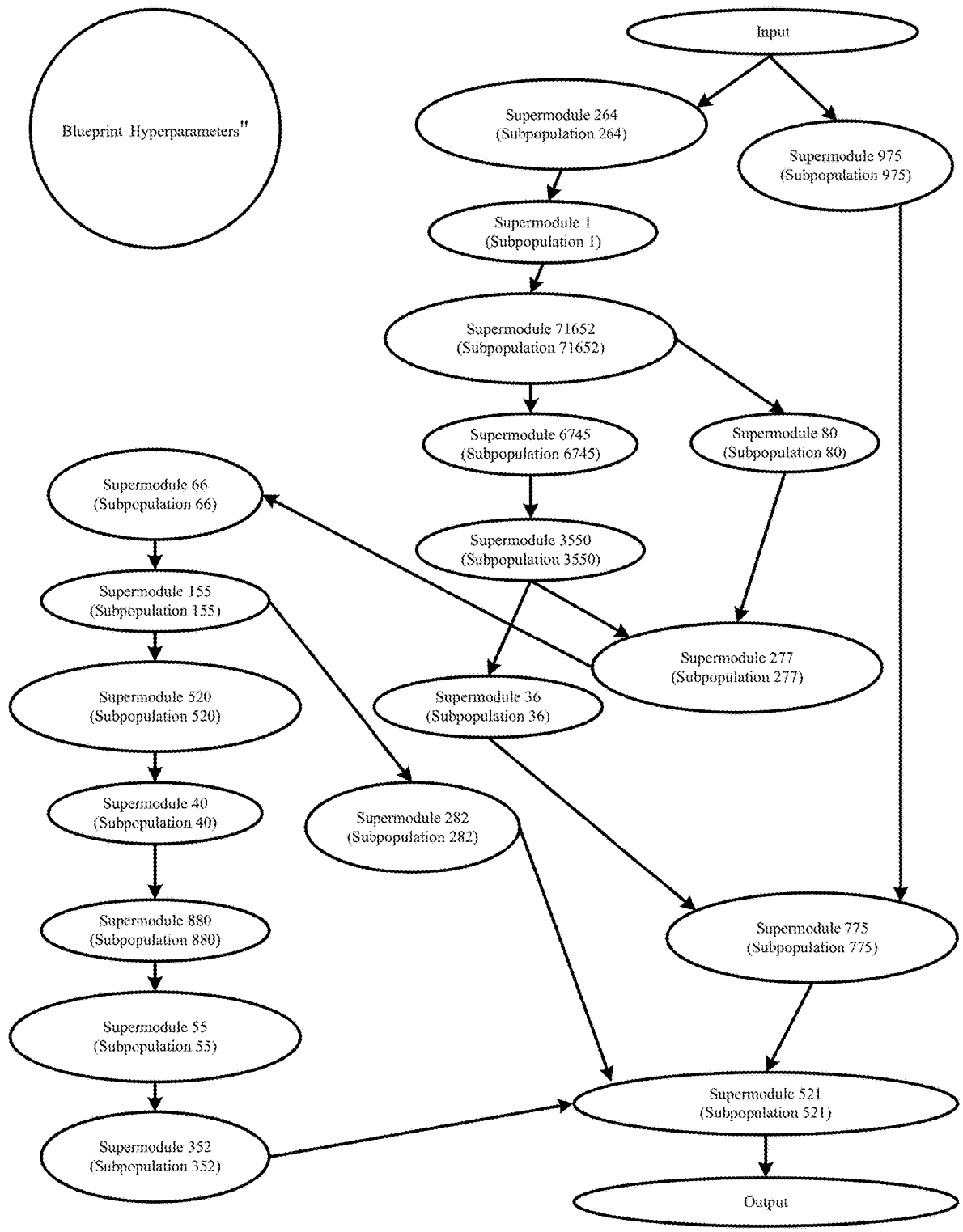

FIGS. 12A, 12B, and 12C illustrate examples of evolved blueprints in accordance with implementations of the technology disclosed. FIG. 12A shows an evolution snapshot of a blueprint after 20 generations. FIG. 12B shows an evolution snapshot of the blueprint after 40 generations. FIG. 12C shows an evolution snapshot of the blueprint after a further generation. As shown in FIGS. 12A-12C, for the blueprint, the following are evolved between some generations or every generation—supermodules, the interconnections between the supermodules, the interconnection weights between the supermodules, modules, the interconnections between the modules, the interconnection weights between the modules, the submodules, the interconnections between the submodules, the interconnection weights between the submodules, the blueprint hyperparameters, the supermodule hyperparameters, the global topology hyperparameters, the global operational hyperparameters, the local topology hyperparameters, and the local operational hyperparameters. In some implementations, the evolution includes, for example, modifying a number of supermodules in the blueprint; modifying the type of supermodules in the blueprint; modifying the interconnections and interconnection weights between the supermodules in the blueprint; modifying a number of modules in a given supermodule; modifying the type of modules in the supermodule; modifying interconnections and interconnection weights between the modules in the supermodule; modifying the hyperparameters in the blueprint; and modifying the hyperparameter values in the blueprint. In some implementations, the interconnections between the supermodules, are branched out or skipped during the evolution.

As discussed above, each supermodule in the blueprint is identified in dependence upon the corresponding supermodule subpopulation identified by the blueprint for that particular supermodule slot, as indicated by the "subpopulation identifier (ID)" hyperparameter depicted in FIGS. 12A, 12B, and 12C within parenthesis for each supermodule slot.

Figure 13A:
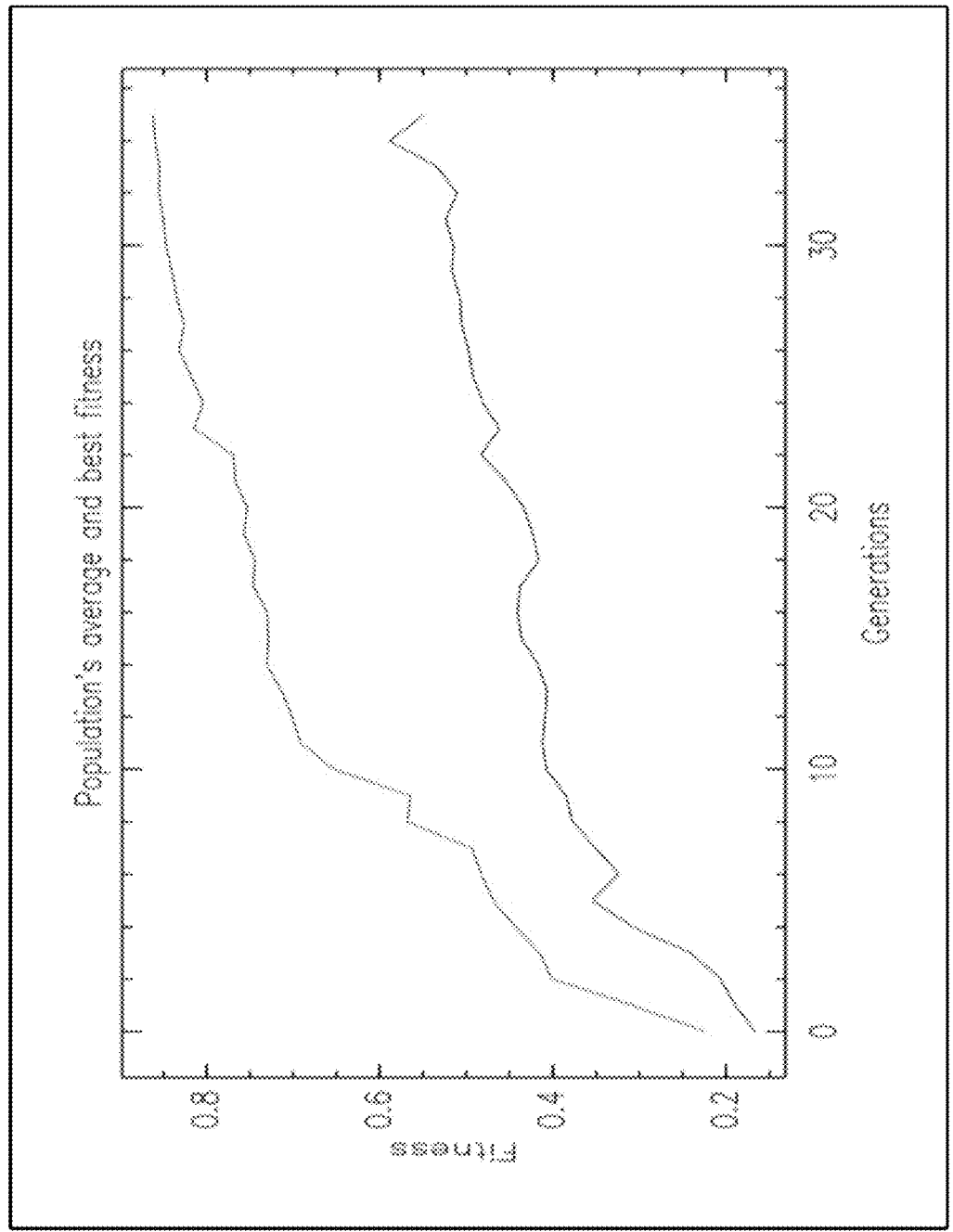
FIG. 13A shows a chart that graphically illustrates performance results of one implementation of the technology disclosed.

FIG. 13A shows a chart that graphically illustrates example performance results 1300A of one implementation of the technology disclosed. In particular, FIG. 13A shows a plot of fitness of a blueprint that the disclosed cooperative evolution technique creates and evolves. As illustrated in FIG. 13A, the blueprint's fitness increases with the number of generations experienced by the blueprint.

Figure 13B:
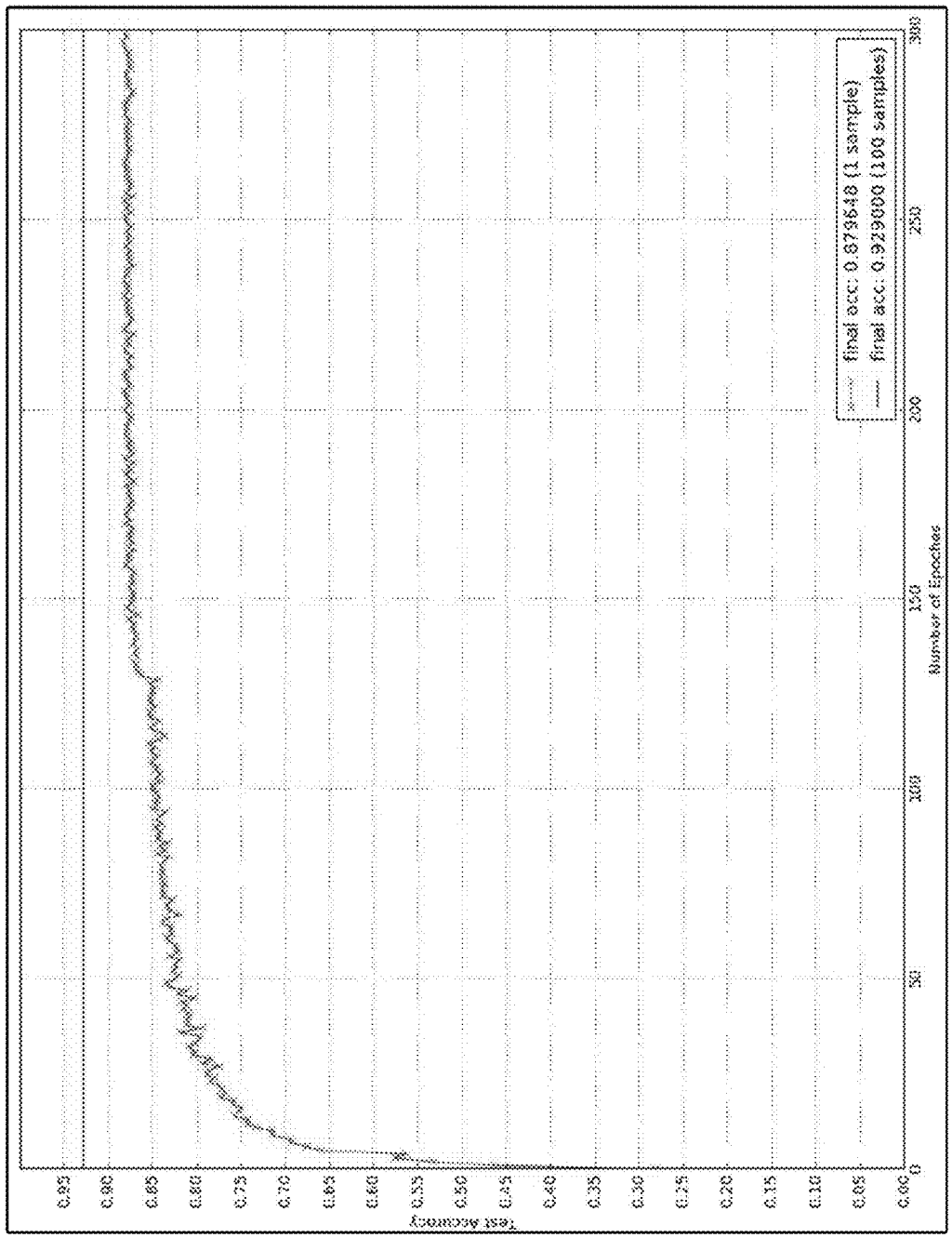
FIG. 13B is another chart that graphically illustrates performance results of another implementation of the technology disclosed.

FIG. 13B is another chart 1300B that graphically illustrates performance results of another implementation of the technology disclosed. In particular, FIG. 13B shows one sample performance (vertical axis) of the best neural network discovered during evolution versus the number of epochs of training and also final converged performance (92.9%) using 100 samples (horizontal axis).

Figure 13C:
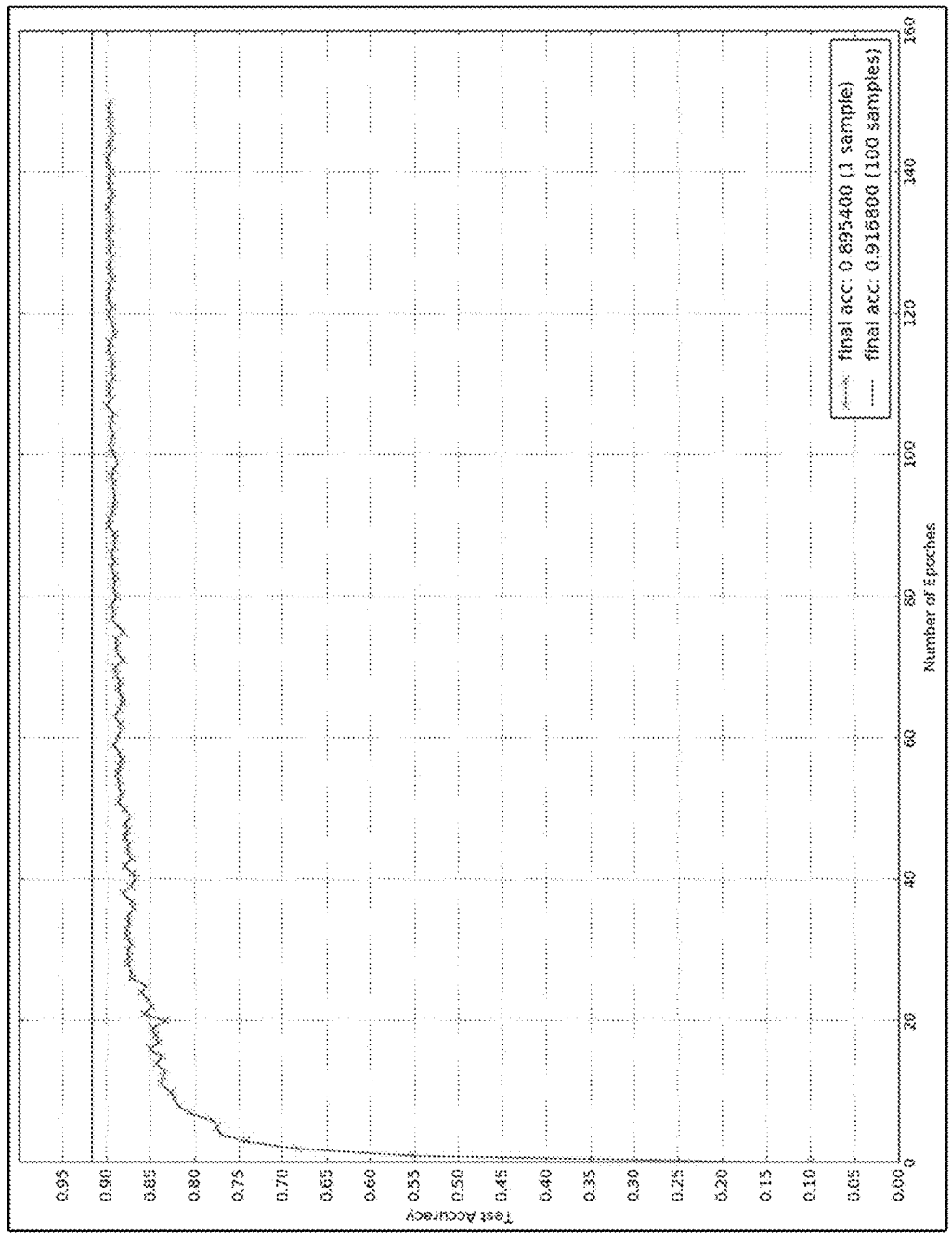
FIG. 13C is yet another that graphically illustrates performance results of yet another implementation of the technology disclosed.

FIG. 13C is yet another chart 1300C that graphically illustrates performance results of yet another implementation of the technology disclosed. In particular, FIG. 13C shows one sample performance (vertical axis) of the best neural network discovered during evolution versus the number of epochs of training and also final converged performance (91.6%) using 100 samples (horizontal axis).

Client-Server Architecture

In this section, the term "genome" is used to equivalently refer to both a blueprint and a supermodule. In some environments, the training data used to evaluate a genome's fitness can be voluminous. Therefore, even with modern high processing power and large memory capacity computers, achieving quality results within a reasonable time is often not feasible on a single machine. A large module pool also requires a large memory and high processing power. In one implementation, therefore, a client/server model is used to provide scaling in order to achieve high quality evaluation results within a reasonable time period. Scaling is carried out in two dimensions, namely in pool size as well as in evaluation of the same genome to generate a more diverse module pool so as to increase the probability of finding fitter genomes. In the client/server implementation, the genome pool is distributed over a multitude of clients for evaluation. Each client continues to evaluate its own client-centric module pool using data from training database 918 of FIG. 9, which it may receive in bulk or periodically on a sustained and continuing basis. Genomes that satisfy one or more predefined conditions on a client computer are transmitted to the server to form part of a server-centric module pool.

Distributed processing of genomes also may be used to increase the speed of evaluation of a given genome. To achieve this, genomes that are received by the server but have not yet been tested on a certain number of samples, or have not yet met one or more predefined conditions, may be sent back from the server to a multitude of clients for further evaluation. The evaluation result achieved by the clients (alternatively called herein as partial evaluation) for a genome is transferred back to the server. The server merges the partial evaluation results of a genome with that genome's fitness estimate at the time it was sent to the clients to arrive at an updated fitness estimate for that genome in the server-centric module pool. For example, assume that a genome has been tested on 500 samples and is sent from the server to, for example, two clients each instructed to test the genome on 100 additional samples. Accordingly, each client further tests the genome on the additional 100 samples and reports its own client-centric fitness estimate to the server. The server combines these two estimates with the genome's fitness estimate at the time it was sent to the two clients to calculate an updated server-centric fitness estimate for the genome. The combined results represent the genome's fitness evaluated over 700 samples. In other words, the distributed system, in accordance with this example, increases the experience level of a genome from 500 samples to 700 samples using only 100 different training samples at each client. A distributed system, in accordance with the technology disclosed, is thus highly scalable in evaluating its genomes.

Advantageously, clients are enabled to perform genome procreation locally, thereby improving the quality of their genomes. Each client is a self-contained evolution device, not only evaluating one or more genomes in its own pool at a time, but also creating a new generation of genomes and moving the evolutionary process forward locally. Thus clients maintain their own client-centric module pool which need not match each other's or the server-centric module pool. Since the clients continue to advance with their own local evolutionary process, their processing power is not wasted even if they are not in constant communication with the server. Once communication is reestablished with the server, clients can send in their fittest genomes to the server and receive additional genomes from the server for further testing.

In yet another implementation, the entire evolution process in not distributed across multiple clients, and only the training and testing, i.e., evaluation, of the genomes is distributed across multiple clients (e.g., each network can be trained and tested on a different client).

Particular Implementations

We describe systems, methods, and articles of manufacture for cooperatively evolving a deep neural network structure. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

A system implementation of the technology disclosed includes one or more processors coupled to the memory. The memory is loaded with computer instructions which, when executed on the processors, cause cooperative evolution of a deep neural network structure that solves a provided problem when trained on a source of training data containing labeled examples of data sets for the problem.

The deep neural network structure includes a plurality of modules and interconnections among the modules. Examples of deep neural network structures include:
  AlexNet
  ResNet
  Inception
  WaveNet
  PixelCNN
  GoogLeNet
  ENet
  U-Net
  BN-NIN
  VGG
  LeNet
  DeepSEA
  DeepChem
  DeepBind
  DeepMotif
  FIDDLE
  DeepLNC
  DeepCpG
  DeepCyTOF
  SPINDLE The memory stores a candidate supermodule genome database that contains a pool of candidate supermodules. Each of the candidate supermodules identify respective values for a plurality of supermodule hyperparameters of the supermodule. The supermodule hyperparameters include supermodule global topology hyperparameters that identify a plurality of modules in the candidate supermodule and module interconnects among the modules in the candidate supermodule. At least one of the modules in each candidate supermodule includes a neural network. Each candidate supermodule has associated therewith storage for an indication of a respective supermodule fitness value.

The memory further stores a blueprint genome database that contains a pool of candidate blueprints for solving the provided problem. Each of the candidate blueprints identify respective values for a plurality of blueprint topology hyperparameters of the blueprint. The blueprint topology hyperparameters include a number of included supermodules and interconnects among the included supermodules. Each candidate blueprint has associated therewith storage for an indication of a respective blueprint fitness value.

The system includes an instantiation module. The instantiation module instantiates each of at least a training subset of the blueprints in the pool of candidate blueprints. At least one of the blueprints is instantiated more than once. Each instantiation of a candidate blueprint includes identifying for the instantiation a supermodule from the pool of candidate supermodules for each of the supermodules identified in the blueprint.

The system includes a training module. The training module trains neural networks on training data from the source of training data. The neural networks are modules which are identified by supermodules in each of the blueprint instantiations. The training includes modifying submodules of the neural network modules in dependence upon back-propagation algorithms.

The system includes an evaluation module. For each given one of the blueprints in the training subset of blueprints, the evaluation module evaluates each instantiation of the given blueprint on validation data to develop a blueprint instantiation fitness value associated with each of the blueprint instantiations. The validation data can be data previously unseen during training of a particular supermodule. For each given one of the blueprints in the training subset of blueprints, the evaluation module updates fitness values of all supermodules identified for inclusion in each instantiation of the given blueprint in dependence upon the fitness value of the blueprint instantiation. For each given one of the blueprints in the training subset of blueprints, the evaluation module updates a blueprint fitness value for the given blueprint in dependence upon the fitness values for the instantiations of the blueprint.

The system includes a competition module. The competition module selects blueprints for discarding from the pool of candidate blueprints in dependence upon their updated fitness values. The competition module then selects supermodules from the candidate supermodule pool for discarding in dependence upon their updated fitness values.

The system includes a procreation module. The procreation module forms new supermodules in dependence upon a respective set of at least one parent supermodule from the pool of candidate supermodules. The procreation module also forms new blueprints in dependence upon a respective set of at least one parent blueprint from the pool of candidate blueprints.

The system includes a solution harvesting module. The solution harvesting module provides for deployment a selected one of the blueprints remaining in the candidate blueprint pool, instantiated with supermodules selected from the candidate supermodule pool.

This system implementation and other systems disclosed optionally include one or more of the following features. System can also include features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

Each supermodule in the pool of candidate supermodules further belongs to a subpopulation of the supermodules.

The blueprint topology hyperparameters of blueprints in the pool of candidate blueprints can also identify a supermodule subpopulation for each included supermodule.

The instantiation module can select, for each supermodule identified in the blueprint, a supermodule from the subpopulation of supermodules which is identified by the blueprint.

The competition module, in selecting supermodules from the candidate supermodule pool for discarding in dependence upon their updated fitness values, can do so in further dependence upon the subpopulation to which the supermodules belong.

The procreation module, in forming new supermodules in dependence upon a respective set of at least one parent supermodule from the pool of candidate supermodules, can form the new supermodules only in dependence upon parent supermodules which belong to the same subpopulation.

The system can be configured to further comprise a re-speciation module which re-speciates the supermodules in the pool of candidate supermodules into updated subpopulations.

The competition module can select supermodules for discarding from the subpopulation with a same subpopulation identifier (ID).

The system can be configured to further comprise a control module which invokes, for each of a plurality of generations, the training module, the evaluation module, the competition module, and the procreation module.

A particular supermodule can be identified in a plurality of blueprint instantiations. The evaluation module can update a supermodule fitness value associated with the particular supermodule in dependence of respective blueprint instantiation fitness values associated with each of the blueprint instantiations in the plurality.

The supermodule fitness value can be an average of the respective blueprint instantiation fitness values. The evaluation module can assign a supermodule fitness value to a particular supermodule if the supermodule fitness value is previously undetermined.

The evaluation module, for a particular supermodule, can merge a current supermodule fitness value with a previously determined supermodule fitness. The merging can include averaging.

The evaluation module can update the blueprint fitness value for the given blueprint by averaging the fitness values for the instantiations of the blueprint.

The supermodule hyperparameters can further comprise module topology hyperparameters that identify a plurality of submodules of the neural network and interconnections among the submodules. Crossover and mutation of the module topology hyperparameters during procreation can include modifying a number of submodules and/or interconnections among them.

Other implementations may include a non-transitory computer readable storage medium storing instructions executable by a processor to perform actions of the system described above.

A computer-implemented method implementation of the technology disclosed includes cooperatively evolving a deep neural network structure that solves a provided problem when trained on a source of training data containing labeled examples of data sets for the problem.

The deep neural network structure includes a plurality of modules and interconnections among the modules. Examples of deep neural network structures include:
  AlexNet
  ResNet
  Inception
  WaveNet
  PixelCNN
  GoogLeNet
  ENet
  U-Net
  BN-NIN
  VGG
  LeNet
  DeepSEA
  DeepChem
  DeepBind
  DeepMotif
  FIDDLE
  DeepLNC
  DeepCpG
  DeepCyTOF
  SPINDLE The method includes storing a candidate supermodule genome database that contains a pool of candidate supermodules. Each of the candidate supermodules identify respective values for a plurality of supermodule hyperparameters of the supermodule. The supermodule hyperparameters include supermodule global topology hyperparameters that identify a plurality of modules in the candidate supermodule and module interconnects among the modules in the candidate supermodule. At least one of the modules in each candidate supermodule includes a neural network. Each candidate supermodule has associated therewith storage for an indication of a respective supermodule fitness value.

The method includes storing a blueprint genome database that contains a pool of candidate blueprints for solving the provided problem. Each of the candidate blueprints identify respective values for a plurality of blueprint topology hyperparameters of the blueprint. The blueprint topology hyperparameters include a number of included supermodules and interconnects among the included supermodules. Each candidate blueprint has associated therewith storage for an indication of a respective blueprint fitness value.

The method includes instantiating each of at least a training subset of the blueprints in the pool of candidate blueprints. At least one of the blueprints is instantiated more than once. Each instantiation of a candidate blueprint includes identifying for the instantiation a supermodule from the pool of candidate supermodules for each of the supermodules identified in the blueprint.

The method includes training neural networks on training data from the source of training data. The neural networks are modules which are identified by supermodules in each of the blueprint instantiations. The training further includes modifying submodules of the neural network modules in dependence upon back-propagation algorithms.

For each given one of the blueprints in the training subset of blueprints, the method includes evaluating each instantiation of the given blueprint on validation data to develop a blueprint instantiation fitness value associated with each of the blueprint instantiations. The validation data can be data previously unseen during training of a particular supermodule. For each given one of the blueprints in the training subset of blueprints, the method includes updating fitness values of all supermodules identified for inclusion in each instantiation of the given blueprint in dependence upon the fitness value of the blueprint instantiation. For each given one of the blueprints in the training subset of blueprints, the method includes updating a blueprint fitness value for the given blueprint in dependence upon the fitness values for the instantiations of the blueprint.

The method includes selecting blueprints for discarding from the pool of candidate blueprints in dependence upon their updated fitness values and then selecting supermodules from the candidate supermodule pool for discarding in dependence upon their updated fitness values.

The method includes forming new supermodules in dependence upon a respective set of at least one parent supermodule from the pool of candidate supermodules and forming new blueprints in dependence upon a respective set of at least one parent blueprint from the pool of candidate blueprints.

The method includes deploying a selected one of the blueprints remaining in the candidate blueprint pool, instantiated with supermodules selected from the candidate supermodule pool.

Each of the features discussed in this particular implementation section for the system implementation apply equally to this method implementation. As indicated above, all the system features are not repeated here and should be considered repeated by reference.

Other implementations may include a non-transitory computer readable storage medium (CRM) storing instructions executable by a processor to perform the method described above. Yet another implementation may include a system including memory and one or more processors operable to execute instructions, stored in the memory, to perform the method described above.

Computer System

Figure 14:
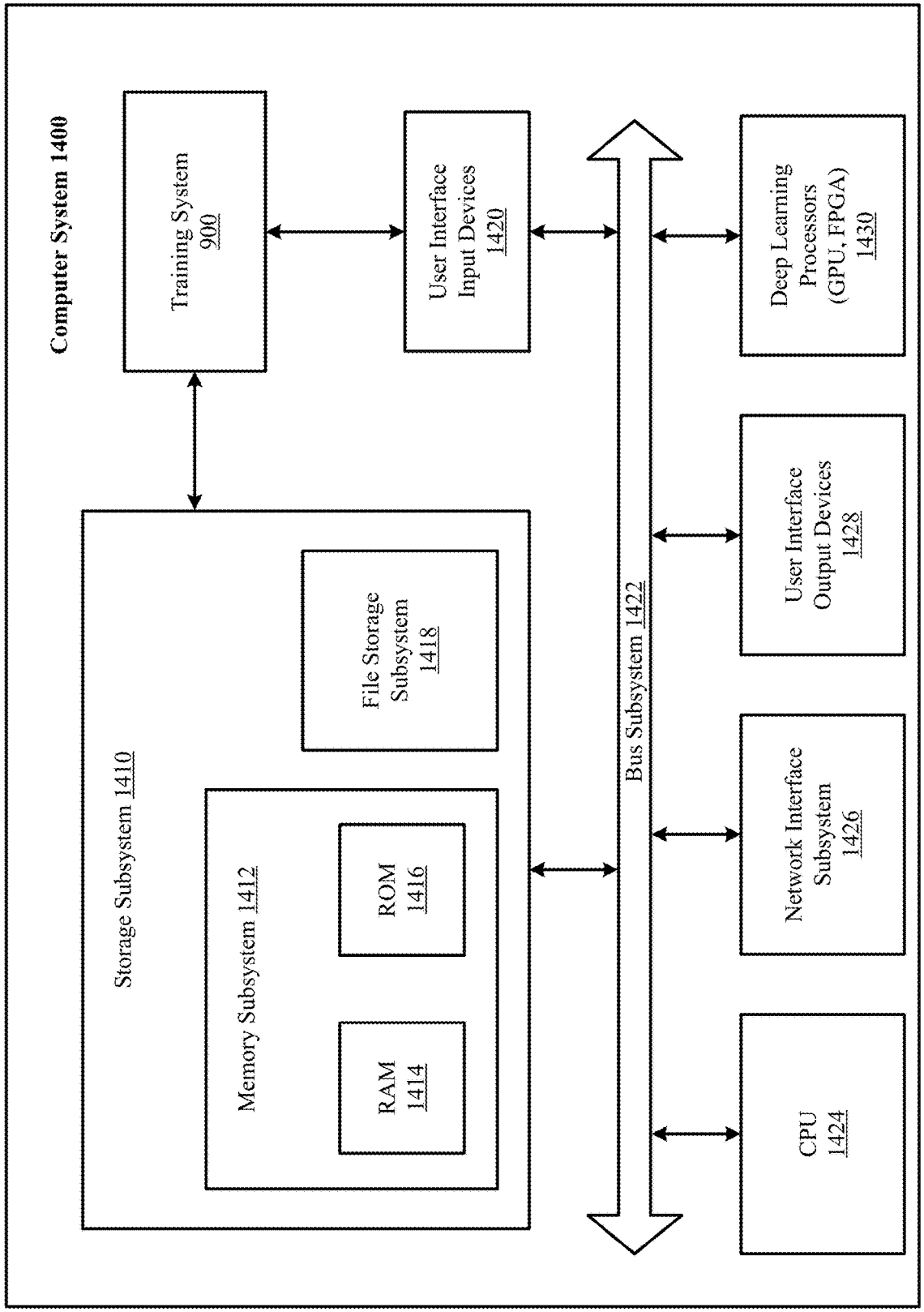
FIG. 14 is a simplified block diagram of a computer system that can be used to implement either or both of the training system and the production system of the technology disclosed.

FIG. 14 is a simplified block diagram of a computer system 1400 that can be used to implement either or both of the training system and the production system of the technology disclosed. Computer system 1400 includes at least one central processing unit (CPU) 1424 that communicates with a number of peripheral devices via bus subsystem 1422. These peripheral devices can include a storage subsystem 1410 including, for example, memory devices and a file storage subsystem 1418, user interface input devices 1420, user interface output devices 1428, and a network interface subsystem 1426. The input and output devices allow user interaction with computer system 1400. Network interface subsystem 1426 provides an interface to outside networks, including an interface to corresponding interface devices in other computer systems.

In one implementation, the training system 900 in FIG. 9 and/or the production system 934 in FIG. 9 are communicably linked to the storage subsystem 1410 and a user interface input devices 1420.

User interface input devices 1420 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1400.

User interface output devices 1428 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1400 to the user or to another machine or computer system.

Storage subsystem 1410 stores programming and data constructs that provide the functionality of some or all of the modules and methods described herein. These software modules are generally executed by deep learning processors 1430.

Deep learning processors 1430 can be graphics processing units (GPUs) or field-programmable gate arrays (FPGAs). Deep learning processors 1430 can be hosted by a deep learning cloud platform such as Google Cloud Platform™, Xilinx™, and Cirrascale™. Examples of deep learning processors 1430 include Google's Tensor Processing Unit (TPU)™, rackmount solutions like GX4 Rackmount Series™, GX8 Rackmount Series™, NVIDIA DGX-1™, Microsoft' Stratix V FPGA™, Graphcore's Intelligent Processor Unit (IPU)™, Qualcomm's Zeroth Platform™ with Snapdragon Processors™, NVIDIA's Volta™, NVIDIA's DRIVE PX™, NVIDIA's JETSON TX1/TX2 MODULE™, Intel's Nirvana™, Movidius VPU™, Fujitsu DPI™, ARM's DynamicIQ™, IBM TrueNorth™, and others.

Memory subsystem 1412 used in the storage subsystem 1410 can include a number of memories including a main random access memory (RAM) 1414 for storage of instructions and data during program execution and a read only memory (ROM) 1416 in which fixed instructions are stored. A file storage subsystem 1418 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1418 in the storage subsystem 1410, or in other machines accessible by the processor.

Bus subsystem 1422 provides a mechanism for letting the various components and subsystems of computer system 1400 communicate with each other as intended. Although bus subsystem 1422 is shown schematically as a single bus, alternative implementations of the bus subsystem can use multiple busses.

Computer system 1400 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1400 depicted in FIG. 14 is intended only as a specific example for purposes of illustrating the preferred embodiments of the present invention. Many other configurations of computer system 1400 are possible having more or less components than the computer system depicted in FIG. 14.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

What is claimed is:

1. A computer-implemented system for cooperatively evolving a deep neural network structure that solves a provided problem when trained on a source of training data containing labeled examples of data sets for the problem, the system comprising:

a memory storing a candidate supermodule genome database having a pool of candidate supermodules, each of the candidate supermodules identifying respective values for a plurality of supermodule hyperparameters of the supermodule, the supermodule hyperparameters including supermodule global topology hyperparameters identifying a plurality of modules in the candidate supermodule and module interconnects among the modules in the candidate supermodule, at least one of the modules in each candidate supermodule including a neural network, each candidate supermodule having associated therewith storage for an indication of a respective supermodule fitness value;

the memory further storing a blueprint genome database having a pool of candidate blueprints for solving the provided problem, each of the candidate blueprints identifying respective values for a plurality of blueprint topology hyperparameters of the blueprint, the blueprint topology hyperparameters including a number of included supermodules, and interconnects among the included supermodules, each candidate blueprint having associated therewith storage for an indication of a respective blueprint fitness value;

a processor which:

instantiates each of at least a training subset of the blueprints in the pool of candidate blueprints, at least one of the blueprints being instantiated more than once, each instantiation of a candidate blueprint including identifying for the instantiation a supermodule from the pool of candidate supermodules for each of the supermodules identified in the blueprint;

trains neural networks on training data from the source of training data, the neural networks are modules which are identified by supermodules in each of the blueprint instantiations, the training includes modifying submodules of the neural network modules in dependence upon back-propagation algorithms;

for each given one of the blueprints in the training subset of blueprints:

evaluates each instantiation of the given blueprint on validation data, to develop a blueprint instantiation fitness value associated with each of the blueprint instantiations, updates fitness values of all supermodules identified for inclusion in each instantiation of the given blueprint in dependence upon the fitness value of the blueprint instantiation, and updates a blueprint fitness value for the given blueprint in dependence upon the fitness values for the instantiations of the blueprint;

selects blueprints for discarding from the pool of candidate blueprints in dependence upon their updated fitness values;

selects supermodules from the candidate supermodule pool for discarding in dependence upon their updated fitness values;

forms new supermodules in dependence upon a respective set of at least one parent supermodule from the pool of candidate supermodules;

forms new blueprints in dependence upon a respective set of at least one parent blueprint from the pool of candidate blueprints; and deploys a selected one of the blueprints remaining in the candidate blueprint pool, instantiated with supermodules selected from the candidate supermodule pool.

2. The system of claim 1, wherein each supermodule in the pool of candidate supermodules further belongs to a subpopulation of the supermodules, wherein the blueprint topology hyperparameters of blueprints in the pool of candidate blueprints also identify a supermodule subpopulation for each included supermodule, wherein the processor further selects, for each supermodule identified in the blueprint, a supermodule from the subpopulation of supermodules which is identified by the blueprint, wherein the selecting supermodules from the candidate supermodule pool for discarding in dependence upon their updated fitness values is done so in further dependence upon the subpopulation to which the supermodules belong, wherein the forming new supermodules in dependence upon a respective set of at least one parent supermodule from the pool of candidate supermodules, forms the new supermodules only in dependence upon parent supermodules which belong to the same subpopulation, and wherein the processor further re-speciates the supermodules in the pool of candidate supermodules into updated subpopulations.

3. The system of claim 2, wherein the processor selects supermodules for discarding from the subpopulation with a same subpopulation identifier (ID).

4. The system of claim 1, wherein the processor repeatedly invokes, for each of a plurality of generations, the training, the evaluating, the updating, the selecting, the forming, and the deploying.

5. The system of claim 1, wherein the validation data is data previously unseen during training of a particular supermodule.

6. The system of claim 1, wherein a particular supermodule is identified in a plurality of blueprint instantiations, and wherein the processor updates a supermodule fitness value associated with the particular supermodule in dependence of respective blueprint instantiation fitness values associated with each of the blueprint instantiations in the plurality.

7. The system of claim 6, wherein the supermodule fitness value is an average of the respective blueprint instantiation fitness values.

8. The system of claim 1, wherein the processor assigns a supermodule fitness value to a particular supermodule if the supermodule fitness value is previously undetermined.

9. The system of claim 1, wherein the processor, for a particular supermodule, merges a current supermodule fitness value with a previously determined supermodule fitness.

10. The system of claim 9, wherein the merging includes averaging.

11. The system of claim 1, wherein the processor updates the blueprint fitness value for the given blueprint by averaging the fitness values for the instantiations of the blueprint.

12. The system of claim 1, wherein the supermodule hyperparameters further comprise module topology hyperparameters that identify a plurality of submodules of the neural network and interconnections among the submodules.

13. The system of claim 12, wherein during the forming, crossover and mutation of the module topology hyperparameters is performed, and wherein crossover and mutation of the module topology hyperparameters includes modifying a number of submodules and/or interconnections among them.

14. A computer-implemented method of cooperatively evolving a deep neural network structure that solves a provided problem when trained on a source of training data containing labeled examples of data sets for the problem, the method including:

storing a candidate supermodule genome database having a pool of candidate supermodules, each of the candidate supermodules identifying respective values for a plurality of supermodule hyperparameters of the supermodule, the supermodule hyperparameters including supermodule global topology hyperparameters identifying a plurality of modules in the candidate supermodule and module interconnects among the modules in the candidate supermodule, at least one of the modules in each candidate supermodule including a neural network, each candidate supermodule having associated therewith storage for an indication of a respective supermodule fitness value;

storing a blueprint genome database having a pool of candidate blueprints for solving the provided problem, each of the candidate blueprints identifying respective values for a plurality of blueprint topology hyperparameters of the blueprint, the blueprint topology hyperparameters including a number of included supermodules, and interconnects among the included supermodules, each candidate blueprint having associated therewith storage for an indication of a respective blueprint fitness value;

instantiating each of at least a training subset of the blueprints in the pool of candidate blueprints, at least one of the blueprints being instantiated more than once, each instantiation of a candidate blueprint including identifying for the instantiation a supermodule from the pool of candidate supermodules for each of the supermodules identified in the blueprint;

training neural networks on training data from the source of training data, the neural networks are modules which are identified by supermodules in each of the blueprint instantiations, the training further includes modifying submodules of the neural networks in dependence upon back-propagation algorithms;

for each given one of the blueprints in the training subset of blueprints,
  evaluating each instantiation of the given blueprint on validation data, to develop a blueprint instantiation fitness value associated with each of the blueprint instantiations,
  updating fitness values of all supermodules identified for inclusion in each instantiation of the given blueprint in dependence upon the fitness value of the blueprint instantiation, and
  updating a blueprint fitness value for the given blueprint in dependence upon the fitness values for the instantiations of the blueprint;

selecting blueprints for discarding from the pool of candidate blueprints in dependence upon their updated fitness values;

selecting supermodules from the candidate supermodule pool for discarding in dependence upon their updated fitness values;

forming new supermodules in dependence upon a respective set of at least one parent supermodule from the pool of candidate supermodules;

forming new blueprints in dependence upon a respective set of at least one parent blueprint from the pool of candidate blueprints; and deploying a selected one of the blueprints remaining in the candidate blueprint pool, instantiated with supermodules selected from the candidate supermodule pool.

15. The computer-implemented method of claim 14, wherein each supermodule in the pool of candidate supermodules further belongs to a subpopulation of the supermodules,
  wherein the blueprint topology hyperparameters of blueprints in the pool of candidate blueprints also identify a supermodule subpopulation for each included supermodule,
  wherein the instantiating includes selecting, for each supermodule identified in the blueprint, a supermodule from the subpopulation of supermodules which is identified by the blueprint,
  wherein, in selecting supermodules from the candidate supermodule pool for discarding in dependence upon their updated fitness values, doing so in further dependence upon the subpopulation to which the supermodules belong,
  wherein, in forming new supermodules in dependence upon a respective set of at least one parent supermodule from the pool of candidate supermodules, forming the new supermodules only in dependence upon parent supermodules which belong to the same subpopulation, and
  wherein the method further includes re-speciating the supermodules in the pool of candidate supermodules into updated subpopulations.

16. The computer-implemented method of claim 14, further including repeatedly performing, for each of a plurality of generations, the training, the evaluating, the updating, the selecting, the forming, and the deploying.

17. The computer-implemented method of claim 14, wherein a particular supermodule is identified in a plurality of blueprint instantiations, and
  further including updating a supermodule fitness value associated with the particular supermodule in dependence of respective blueprint instantiation fitness values associated with each of the blueprint instantiations in the plurality.

18. A non-transitory computer readable storage medium impressed with computer program instructions to cooperatively evolve a deep neural network structure that solves a provided problem when trained on a source of training data containing labeled examples of data sets for the problem, the instructions, when executed on a processor, implement a method comprising:

storing a candidate supermodule genome database having a pool of candidate supermodules, each of the candidate supermodules identifying respective values for a plurality of supermodule hyperparameters of the supermodule, the supermodule hyperparameters including supermodule global topology hyperparameters identifying a plurality of modules in the candidate supermodule and module interconnects among the modules in the candidate supermodule, at least one of the modules in each candidate supermodule including a neural network, each candidate supermodule having associated therewith storage for an indication of a respective supermodule fitness value;

storing a blueprint genome database having a pool of candidate blueprints for solving the provided problem, each of the candidate blueprints identifying respective values for a plurality of blueprint topology hyperparameters of the blueprint, the blueprint topology hyperparameters including a number of included supermodules, and interconnects among the included supermodules, each candidate blueprint having associated therewith storage for an indication of a respective blueprint fitness value;

instantiating each of at least a training subset of the blueprints in the pool of candidate blueprints, at least one of the blueprints being instantiated more than once, each instantiation of a candidate blueprint including identifying for the instantiation a supermodule from the pool of candidate supermodules for each of the supermodules identified in the blueprint;

training neural networks on training data from the source of training data, the neural networks are modules which are identified by supermodules in each of the blueprint instantiations, the training further includes modifying submodules of the neural networks in dependence upon back-propagation algorithms;

for each given one of the blueprints in the training subset of blueprints,
- evaluating each instantiation of the given blueprint on validation data, to develop a blueprint instantiation fitness value associated with each of the blueprint instantiations,
- updating fitness values of all supermodules identified for inclusion in each instantiation of the given blueprint in dependence upon the fitness value of the blueprint instantiation, and
- updating a blueprint fitness value for the given blueprint in dependence upon the fitness values for the instantiations of the blueprint;

selecting blueprints for discarding from the pool of candidate blueprints in dependence upon their updated fitness values;

selecting supermodules from the candidate supermodule pool for discarding in dependence upon their updated fitness values;

forming new supermodules in dependence upon a respective set of at least one parent supermodule from the pool of candidate supermodules;

forming new blueprints in dependence upon a respective set of at least one parent blueprint from the pool of candidate blueprints; and deploying a selected one of the blueprints remaining in the candidate blueprint pool, instantiated with supermodules selected from the candidate supermodule pool.

19. The non-transitory computer readable storage medium of claim 18, wherein each supermodule in the pool of candidate supermodules further belongs to a subpopulation of the supermodules,
- wherein the blueprint topology hyperparameters of blueprints in the pool of candidate blueprints also identify a supermodule subpopulation for each included supermodule,
- wherein the instantiating includes selecting, for each supermodule identified in the blueprint, a supermodule from the subpopulation of supermodules which is identified by the blueprint,
- wherein, in selecting supermodules from the candidate supermodule pool for discarding in dependence upon their updated fitness values, doing so in further dependence upon the subpopulation to which the supermodules belong,
- wherein, in forming new supermodules in dependence upon a respective set of at least one parent supermodule from the pool of candidate supermodules, forming the new supermodules only in dependence upon parent supermodules which belong to the same subpopulation, and
- wherein the method further includes re-speciating the supermodules in the pool of candidate supermodules into updated subpopulations.

20. The non-transitory computer readable storage medium of claim 18, implementing the method further comprising repeatedly performing, for each of a plurality of generations, the training, the evaluating, the updating, the selecting, the forming, and the deploying.

* * * * *